(12) United States Patent
Barber et al.

(10) Patent No.: US 9,764,904 B2
(45) Date of Patent: Sep. 19, 2017

(54) CONTINUOUS MOTION PRODUCT SELECTION AND GROUPING SYSTEM

(71) Applicant: Graphic Packaging International, Inc., Atlanta, GA (US)

(72) Inventors: Jared B. Barber, Sandy, UT (US); Colin Ford, Woodstock, GA (US)

(73) Assignee: Graphic Packaging International, Inc., Atlanta, GA (US)

( * ) Notice: Subject to any disclaimer, the term of this patent is extended or adjusted under 35 U.S.C. 154(b) by 0 days.

(21) Appl. No.: 15/148,308

(22) Filed: May 6, 2016

(65) Prior Publication Data

US 2016/0251168 A1    Sep. 1, 2016

Related U.S. Application Data

(63) Continuation of application No. 14/315,812, filed on Jun. 26, 2014, now Pat. No. 9,365,358.

(Continued)

(51) Int. Cl.
*B65G 47/26*    (2006.01)
*B65G 47/84*    (2006.01)

(Continued)

(52) U.S. Cl.
CPC .......... *B65G 47/086* (2013.01); *B65G 37/00* (2013.01); *B65G 47/30* (2013.01); *B65G 47/71* (2013.01);

(Continued)

(58) Field of Classification Search
CPC .. B65G 47/261; B65G 47/086; B65G 47/845; B65G 47/846

(Continued)

(56) References Cited

U.S. PATENT DOCUMENTS 2,007,981 A    7/1935    Nordquist
2,868,243 A    1/1959    Henschen et al.
(Continued)

FOREIGN PATENT DOCUMENTS

CN    1895972 A    1/2007
CN    101489872 A    7/2009
(Continued)

OTHER PUBLICATIONS

Notification of the First Office Action and Search Report for CN 201480036677.9 dated Aug. 3, 2016, with English translation.

(Continued)

*Primary Examiner* — Douglas Hess
(74) *Attorney, Agent, or Firm* — Womble Carlyle Sandridge & Rice, LLP

(57) ABSTRACT

A product selection and grouping system for the metering, selection, grouping and accumulation of varying size and/or configuration products into packs for packing in a substantially continuous motion operation is provided. The product selection and grouping system includes a metering station that receives the products in a substantially continuous line of flow from a product infeed, and meters the line of products to selectively form a series of spaces therebetween. The metered products are formed and fed to a product grouping conveyor in groups of sets a selected number of products, and are engaged by laning flights of a laning unit, which transfer the product groups to selected ones of a series of lanes defined along the product grouping conveyor. The groups of products are accumulated for transfer to a downstream packing machine.

26 Claims, 13 Drawing Sheets

Related U.S. Application Data

(60) Provisional application No. 61/957,308, filed on Jun. 28, 2013, provisional application No. 61/845,393, filed on Jul. 12, 2013.

(51) Int. Cl.
*B65G 47/08* (2006.01)
*B65G 37/00* (2006.01)
*B65G 47/30* (2006.01)
*B65G 47/71* (2006.01)

(52) U.S. Cl.
CPC ......... *B65G 47/845* (2013.01); *B65G 47/846* (2013.01)

(58) Field of Classification Search
USPC ...... 198/418.7, 419.1, 426, 430, 442, 459.2, 198/459.6
See application file for complete search history.

(56) References Cited

U.S. PATENT DOCUMENTS

| | | |
|---|---|---|
| 3,193,078 A | 7/1965 | Amenta et al. |
| 3,311,217 A | 3/1967 | Muhlenbruch |
| 3,388,815 A | 6/1968 | Lingl |
| 3,469,673 A | 9/1969 | Gentry |
| 3,556,279 A | 1/1971 | Cotter |
| 3,618,743 A | 11/1971 | Benatar et al. |
| 4,018,324 A | 4/1977 | Kamphues |
| 4,577,745 A | 3/1986 | Calvert et al. |
| 4,768,329 A | 9/1988 | Borrow |
| 4,934,129 A | 6/1990 | Hoffman et al. |
| 5,020,655 A | 6/1991 | Cruver |
| 5,174,430 A | 12/1992 | Ebira |
| 5,271,709 A | 12/1993 | VanderMeer et al. |
| 5,547,004 A | 8/1996 | Fransen |
| 5,727,365 A | 3/1998 | Lashyro et al. |
| 5,944,165 A | 8/1999 | Mannlein et al. |
| 6,105,338 A | 8/2000 | Kalany et al. |
| 6,889,485 B2 | 5/2005 | Davaillon |
| 6,907,979 B2 | 6/2005 | Ford et al. |
| 7,000,755 B2 | 2/2006 | van Pinxteren et al. |
| 7,055,671 B2 | 6/2006 | De Guglielmo et al. |
| 7,104,027 B2 | 9/2006 | Ford et al. |
| 7,128,217 B2 | 10/2006 | Henry |
| 7,134,258 B2 | 11/2006 | Kalany et al. |
| 7,240,784 B2 | 7/2007 | Bonnain et al. |
| 7,316,103 B2 | 1/2008 | Ford |
| 7,341,141 B2 | 3/2008 | Spatafora |
| 7,481,309 B2 | 1/2009 | Wagner et al. |
| 7,726,464 B2 | 6/2010 | Cerf |
| 7,779,606 B2 | 8/2010 | Ford |
| 7,784,599 B2 | 8/2010 | Balleza et al. |
| 7,815,034 B2 | 10/2010 | Fleck et al. |
| 7,921,983 B2 | 4/2011 | Gimmerstam et al. |
| 8,002,105 B2 | 8/2011 | Duchemin et al. |
| 8,079,458 B2 | 12/2011 | Fleischmann et al. |
| 8,113,335 B2 | 2/2012 | Aronsson et al. |
| 8,286,781 B2 | 10/2012 | Kamps et al. |
| 8,596,446 B2 | 12/2013 | Biggel et al. |
| 8,695,781 B2 | 4/2014 | Mougin et al. |
| 9,085,421 B2 | 7/2015 | Ford |
| 9,174,753 B2 | 11/2015 | Cain |
| 9,365,358 B2 * | 6/2016 | Barber ................. B65G 47/086 |
| 2004/0050663 A1 | 3/2004 | Ford et al. |
| 2005/0230221 A1 | 10/2005 | Guglielmo et al. |
| 2008/0257684 A1 | 10/2008 | Weller |
| 2010/0043355 A1 | 2/2010 | Duperray et al. |
| 2010/0162668 A1 | 7/2010 | Cain |
| 2011/0030311 A1 | 2/2011 | Martini |
| 2014/0061000 A1 | 3/2014 | Ford |

FOREIGN PATENT DOCUMENTS

| | | |
|---|---|---|
| CN | 102083694 A | 6/2011 |
| CN | 102272005 A | 12/2011 |
| WO | WO 96/08434 A1 | 3/1996 |

OTHER PUBLICATIONS

International Search Report and Written Opinion for PCT/US2014/043310 dated Oct. 23, 2014.

Supplementary European Search Report for EP 14 81 8304 dated Feb. 15, 2017.

\* cited by examiner

CONTINUOUS MOTION PRODUCT SELECTION AND GROUPING SYSTEM

CROSS REFERENCE TO RELATED APPLICATIONS

The present Patent Application is a continuation of previously filed, co-pending U.S. patent application Ser. No. 14/315,812, filed Jun. 26, 2014, which is a formalization of previously filed U.S. Provisional Patent Application Ser. No. 61/957,308, filed Jun. 28, 2013 and U.S. Provisional Patent Application Ser. No. 61/845,393, filed Jul. 12, 2013 by the inventors named in the present Application. This Patent Application claims the benefit of the filing date of these cited Patent Applications according to the statutes and rules governing provisional patent applications, particularly 35 U.S.C. §119(a)(i) and 37 C.F.R. §1.78(a)(4) and (a)(5). The specification and drawings of the patent applications referenced above are specifically incorporated herein by reference as if set forth in their entireties.

FIELD OF THE INVENTION

The present invention generally relates to product packaging systems, and in particular to a system and method for the metering, selection, grouping and segregation of products into lanes to create product packs for packing by a downstream packaging machine or system.

BACKGROUND OF THE INVENTION

In recent years, as an alternative to conventional beverage or liquid packaging such as bottles and cans, "aseptic bricks" or similar substantially rectangular packages, such as juice boxes, pouches, or the like, have become increasingly popular. Such aseptic brick type packages can include a foil or paperboard tube or sleeve filled with a liquid or semi-liquid materials, such as juices or other beverages, or flowable bulk materials, the ends of which are then sealed to form a lightweight, disposable container. Such aseptic bricks or containers further often are packaged in groups such a four packs, six packs, eight packs, ten packs, etc., in which the generally rectangular or square shaped bricks are placed side-by-side in rows and typically are shrink wrapped or otherwise banded together for shipment and/or sale.

The generally square or rectangular configuration of aseptic bricks and use of paperboard or other generally compressible materials, which also often are coated with a wax or other sealing materials, can create problems for the efficient automated packaging of such aseptic bricks or containers. Typically, the aseptic bricks are fed from the filling and sealing equipment, in which these containers are filled with liquid or other flowable materials and sealed, are fed in a continuous line or stream of products, wherein they can tend to become tightly compacted or compressed together in an end-to-end abutting arrangement, particularly at higher production speeds. Since the sides or ends of the bricks generally are flat, there typically are little or no gaps between the aseptic bricks, whereby conventional selectors, such as star wheels, can engage and separate or segregate the products into groups or sets as needed for packaging, as can be done with bottles or cans having a rounded or cylindrical cape.

As a result, conventional selector systems for the handling of aseptic bricks or similar packages often will utilize intermittent or stop/start motions to try to create some separation between the bricks. For example, some selector systems or units receiving bricks in continuous line will attempt to slow or break the movement of the bricks by clamping the sides of the bricks and then indexing or indexing the bricks to another position for discharge into separate lanes. Such stop/start motions are repeated to form a queue of separated bricks that can then be intermittently fed to a packaging machine individually or by groups of, for example, six to twelve bricks. Such indexed, intermittent feeding motions generally are used to reduce incidents of jamming or bunching of the bricks, but they also correspondingly reduce cycle time for the feeding and packaging of the bricks, which accordingly can limit production rates for packaging these aseptic bricks. In addition, an accumulation conveyor, generally having a length that is dependent on the laning operation of the bricks, further is needed to separately maintain the bricks for feeding into a separate intermittent grouping unit prior to the bricks being fed into the packing machine.

Still further, the size and generally rectangular shape or configuration of most aseptic bricks, creating flat surfaces that are generally placed in an edge-to-edge abutment, as well as the use of waxes or other sealing materials on such surfaces, also can lead to problems with the control of the bricks, especially when there is a change in velocity, such as a stop/start or other intermittent movement of the bricks wherein the speed of the bricks is increased to try to create a series of gaps or spaces as needed to enable engagement by conventional selector systems or devices. Such stopping and starting movements further can result in tipping or undesirable shifting of the bricks, especially for taller or elongated bricks or containers, which problem can be compounded by the drag exerted by the waxy surfaces of the bricks, as well as the limited points or areas of engagement of the bricks by most conventional selector mechanisms.

Accordingly, it can be seen that a need exists for a system and method for the metering, selection and grouping of aseptic bricks or other, similar containers into product groups for introduction into a product packaging machine, which enables the packaging of such an aseptic bricks or similar containers at increased rates and/or without disrupting the substantially continuous motion of the aseptic bricks or containers, and which addresses the foregoing and other related and unrelated problems in the art.

SUMMARY OF THE INVENTION

Briefly described, the present invention relates to a system and method for the metering, selection, and grouping of products such as "aseptic bricks" or other, similar products into desired size product groups for accumulation into product packs of a desired size and transfer to a packaging or packing machine. For example, the products can include bricks or other containers having substantially rectangularly or square shaped configurations and can be received in a substantially continuous line from an upstream filling system or assembly, with the products being moved along a path of travel along a product input conveyor in substantially end-to-end abutment with one another. It will, however, be understood that other types of containers or products having other, varying configurations, also can be processed through the system and method of the present invention.

As the bricks or products are fed into the product selection and grouping system of the present invention, they will pass through an initial, metering station at an upstream end of the product selection and grouping system. The metering station generally will include a series of guides defining a substantially arcuate, curved or serpentine path travel of the bricks therethrough. As the bricks enter the metering station, they typically are engaged by and/or will pass about a metering wheel, which causes an initial separation between adjacent or abutting sides of the bricks to reduce line pressure of the incoming line of bricks and help create or produce gaps between the abutting edges or surfaces of the bricks. As the bricks continue around a second portion of their path of travel through the metering station, they can be engaged by fingers of a gapping wheel.

In one embodiment, the gapping wheel can have a series of fingers arranged at a desired spacing. In other embodiments, the gapping wheel can include a series of extensible fingers that can be moved into engagement with the line of bricks. For example, the fingers can extend or project from a series of articulating and/or adjustable lugs that can engage one or more cam tracks as the gapping wheel is rotated for guiding movement of the lugs and their fingers toward and/or away from the bricks. Movement of the lugs can be selectively controlled to increase the gap size of the gaps or spaces created between the bricks to accommodate different sizes or configurations of bricks or other products and/or varying product groupings. The fingers of the gapping wheel will engage and/or can be extended into the initial gaps or areas of separation between the incoming bricks, so as to foam spaces of a desired gap size or amount between each brick, while also holding line pressure within the flow of bricks as the bricks are conveyed about the second portion of their path of travel through the metering station. As a result, a gapped flow of bricks can be provided, which further can help enable feeding of the bricks in timed positions or at a metered rate as needed or desired.

As the spaced bricks move along a third section of their path of travel through the metering station, they will be engaged by fingers or projections of a grouping or transfer wheel. The grouping wheel can have a reduced number of lugs, projections or fingers, which can be set at a spacing to selectively enter the spaces between a desired or set number of bricks, for example, entering the line of bricks between every second, third, fourth, fifth or sixth product. The grouping wheel further can be run at varying rates with the movement of its fingers timed to enter and separate the bricks into various groups or numbers of products. The grouping wheel also typically can be run at a faster rate than the gapping wheel so as to gather and transfer the products in substantially compacted, back-to-back groups to a product grouping conveyor, which generally will be running at substantially the same speed as the grouping wheel so as to maintain the stability of the product groups.

The product grouping conveyor will be formed with a series of lanes, i.e., two to three lanes, although more or fewer lanes can be used and will be positioned adjacent the downstream or discharge end of the metering station. The groups of products will be selectively received within these lanes and moved toward an accumulation and discharge point at the downstream or discharge end of the product grouping conveyor. In addition, a laning unit will be provided along the product grouping conveyor, including a series of laning flights arranged in groups based upon a number of lanes into which the product groups are to be separated. For example, if the product groups are to be separated into 3 lanes of the product grouping conveyor, the laning flights can be arranged in groups of three. Each laning flight also will include a flight plate or product engaging element, typically having a substantially L-shaped construction including a leading finger or forward section against which a foremost or leading brick of a group of bricks is received and engaged as the groups of bricks are fed from the metering station, and a horizontal pusher plate or base that engages the side edges of the product group. The flight plates further are mounted along brackets or arms, which in turn are each mounted on a laterally movable carriage. The support aims or brackets of the laning flights of each group or set of laning flights further can be of different lengths, whereby the groups or sets of bricks or products engaged thereby will be moved to different distances or lengths across the product grouping conveyor as needed for selectively placing the product groups into each of the different lanes of the product grouping conveyor.

The laning unit additionally generally will include one or more conveying mechanisms extending in a substantially elliptical path about the body of the laning unit and carrying a series of spaced guide rods along which the carriages of each of the laning units are mounted. A series of cam tracks also are formed about the laning unit body, each of the cam tracks being selectively engaged by different ones of the laning flights of each group or set of laning flights for controlling the different, varying movements of the laning flights across the product grouping conveyor.

As the laning flights are conveyed about their path of travel in timed relation with the feeding of the groups of products to the product grouping conveyor by the metering station, the cam rollers of the carriages of the laning flights also move along their corresponding or associated cam tracks. As a result, as the laning flights are moved longitudinally along the path of travel of the product groups along the product grouping conveyor, they also are moved transversely into engagement with their selected groups of products, so as to move the product groups laterally across the product grouping conveyor by a distance sufficient to place each of the product groups into a selected or corresponding lane. Once each group of products is transferred to its selected lane of the product groping conveyor, its associated laning flight will be retracted out of engagement with its product group. As each product group is released by its laning flight, it will be accelerated downstream due to the product grouping conveyor generally being moved at a faster rate or speed. The upstream or outermost groups of products typically are released by their laning flights earlier than the closer or downstream product groups, the movement of which also can be slowed or slightly delayed by the engagement with their associated laning flights, to enable each of the groups of products to catch up or otherwise be moved into substantially aligned arrangement or pack at a transfer or dead plate at the discharge end of the product grouping and conveyor. Thereafter, the assembled packs can be transferred to a packaging or packing machine product.

Various features, objects, advantages, and aspects of the present invention further may be set forth or will become apparent to those skilled in the art upon consideration of the following detailed description, when taken in conjunction with the accompanying drawings.

Figure 1:
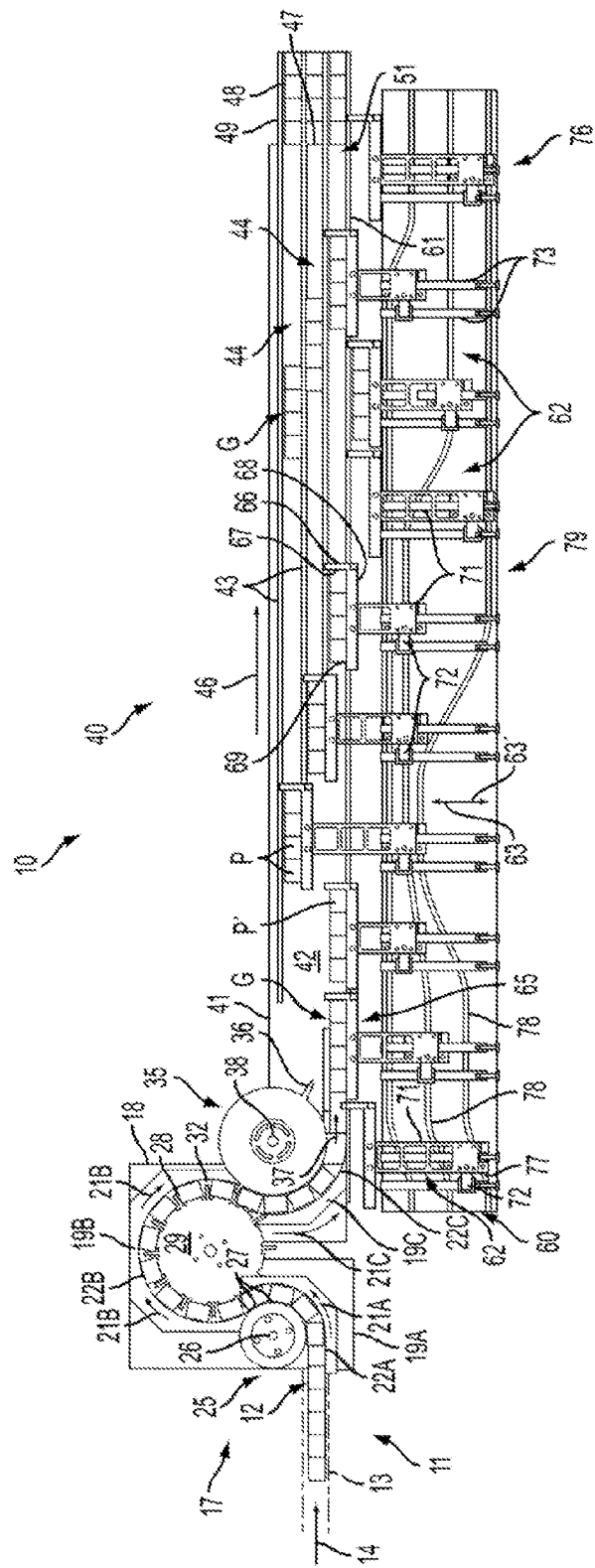
FIG. 1 is a plan view schematically illustrating the product selection and grouping system according to one embodiment of the present invention.

It will be understood by those skilled in the art that the drawings accompanying the present disclosure are included to provide a further understanding of the present disclosure and are incorporated in and constitute a part of the specification illustrating various aspects, features and advantages of the present disclosure and invention, and together with the following detailed description, serve to explain the principals of the present invention. In addition, those skilled in the art will understand that according to common practice, various features of the drawings discussed below are not necessarily drawn to scale, and that dimensions of various features and elements of the drawings shown therein or discussed below are provided simply as examples and are not to be construed as limiting the scope of the present invention, and further that the drawings and features thereof may be expanded or reduced or moved to exploded positions in order to more clearly illustrate the principles and embodiments of the present invention as set forth in the present disclosure.

DETAILED DESCRIPTION

Referring now to the drawings in which like numerals indicate like parts throughout the several views, FIGS. 1-4 illustrate an example embodiment of a product selection and grouping system 10 according to the principles of the present invention. The product selection and grouping system 10 is shown in the figures as being used with substantially square or substantially rectangular shaped products P, although it will be understood by those skilled in the art that various other configurations or product shapes also can be used, including round, cylindrical, or multi-sided products. As one example, the products P can include aseptic bricks, or other, similar products typically formed from a foil, paperboard, or other similar compressible materials, and with such bricks or containers typically having substantially flat side surfaces. The products further can be fed in an end-to-end, abutting relationship from a filling system or machine, such as a form-fill and seal type machine or other upstream product filling equipment. The product selection and grouping system 10 further can reconfigured as needed for selecting and grouping products into different product group formats by the use of change parts, variation of conveying and/or metering speeds, as well as by varying the length of the product selection and grouping system as needed or desired.

As illustrated in FIG. 1, the products P generally are received at an upstream end 11 of the product selection grouping system 10, generally being fed as a substantially continuous line or flow of products 12 along a product infeed 13. The product infeed generally can include a conveyor such as a belted or chain conveyor, or other, similar conveying mechanisms, as will be understood by those skilled in the art. The line 12 of products P generally will be received in an edge-to-edge abutting relationship in a substantially continuous line or flow of products along an infeed path of travel, indicated by arrow 14, into a metering station 17 located at the upstream end 11 of the product selection and grouping system 10, as indicated in FIGS. 1-4.

Figure 3:
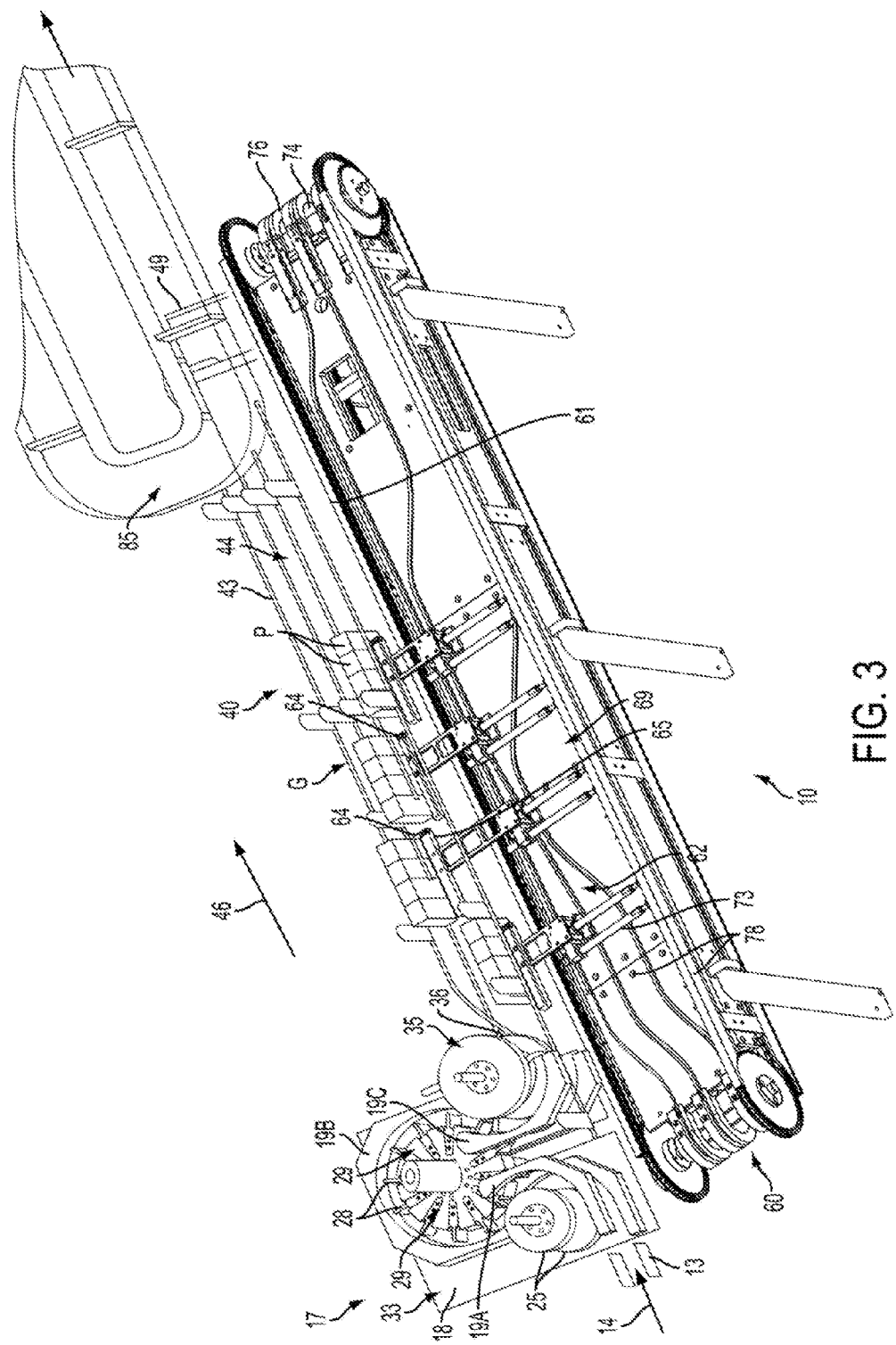
FIG. 3 is a perspective view of the product selection and grouping system of FIG. 1, illustrating the laning and transfer of the products for feeding to a downstream packaging or packing machine.

As shown in FIGS. 1 and 3, the metering station 17 generally includes a frame 18 including a series of substantially arcuate guides 19A-19C that define a substantially curved, arcuate or serpentine path travel, indicated by arrows 21A-21C. The guides 19A-19C generally are shown as curved plates or rails having guide faces 22A-22C along which the flow or line 12 of products P will be moved so that the line of products is redirected along the path of travel 21A-21C through the metering station. The guides further typically will be formed from a substantially nonstick, nonskid or reduced friction material to prevent binding or drag of the products as the products are moved along their path of travel 21A-21C through the metering station 17. For example, the guides 19A-19C can be made from a polished metal such as stainless steel, or can be made from a synthetic or plastic material such as Delrin® or other, nonstick, reduced friction material.

Figure 4:
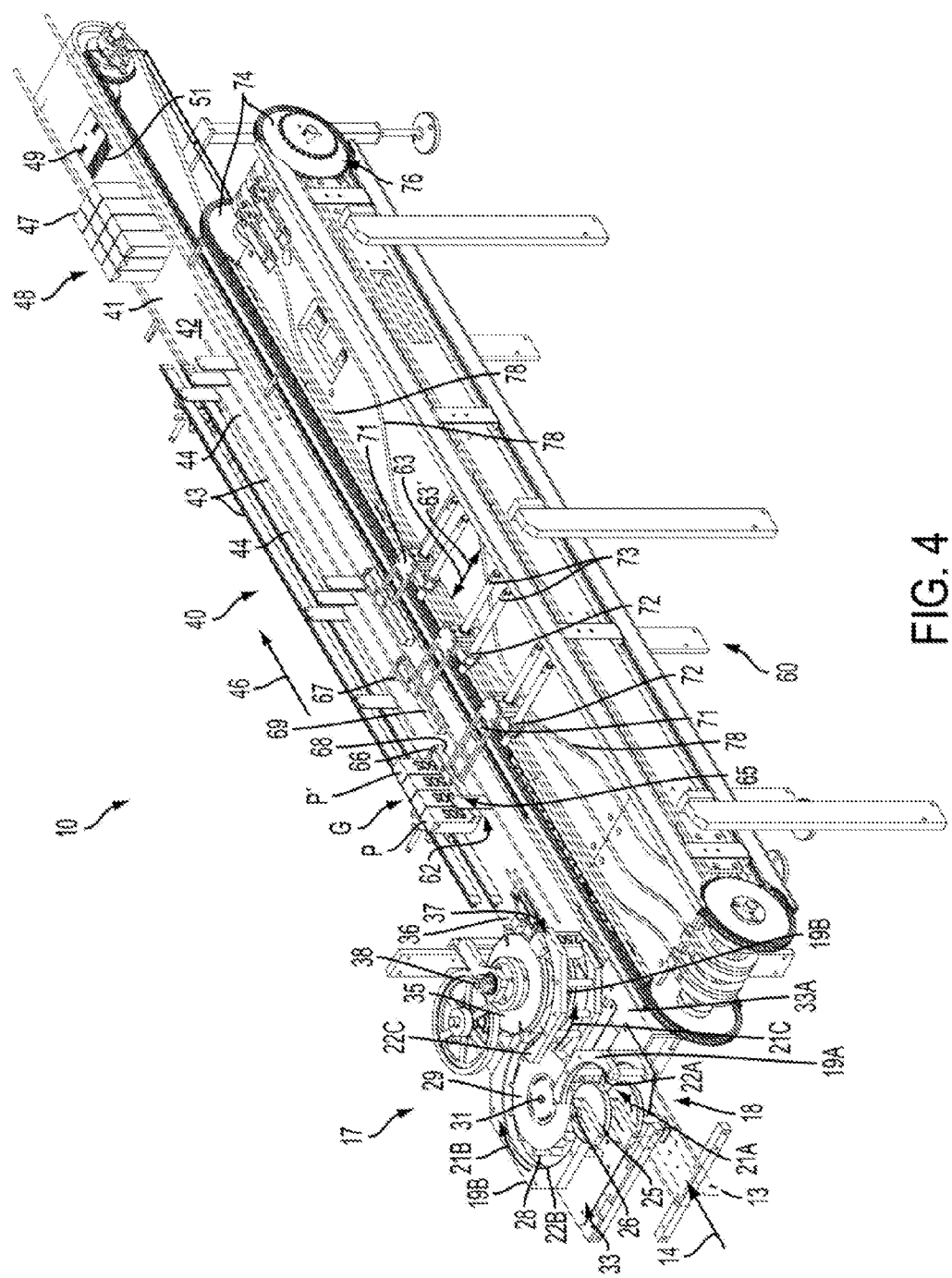
FIG. 4 is a perspective view of the product selection and grouping system of FIG. 1.

As further shown in FIGS. 1, 3 and 4, the metering station also can include a metering wheel 25 (or, as indicated in FIGS. 3-4, a pair of metering wheels, depending on product size and configuration). The metering wheel 25 can be formed from a non-stick or reduced friction material, and can be a substantially free-rotating or idler type wheel that rotates about an axle 26 as the products are fed along their initial path of travel 21A through the metering station 17, as shown in FIG. 1. As the line 12 of products P engages and is guided around the free-rotating metering wheel 25, as indicated in FIG. 1, initial gaps or openings 27 generally will be formed in the line of products, between the outside edges thereof. Such gaps 27 thus cause an initial break or separation in the edge-to-edge abutment between the incoming products and help to reduce line pressure between the products, without substantially disrupting or causing a delay in the flow of products into the metering station.

In addition, the diameter of the metering wheel 25 can be varied as needed to create varying desired size initial gaps or openings 27 between the products of the incoming line of products, such as for feeding and metering different sizes of products passing through the metering station. The metering wheel also can be driven by a motor or similar drive as needed to form the required size gaps and to help move the line of products through the metering station, and can further include a frictional or gripping material that facilitates the engagement and movement of the products by the metering wheel. For example, for larger or heavier products, the metering wheel could be driven by a drive motor, or linked via a drive belt, chain, or other linkage to a motor or drive for the other driven elements of the metering station, and can be covered with a rubberized or other frictional or tacky coating or have a knurled, roughened or otherwise textured surface to help provide a positive engaging contact or gripping engagement between the metering wheel and the products entering the metering station for creating the desired size gaps therebetween without substantially delaying or otherwise adversely impeding the flow of products. Still further, the metering wheel could be replaced with one or more belts, chains or similar mechanisms, as shown at 25' in FIG. 5, which guide the line of products along their curved or arcuate path 21A-21B to form the gaps 27 therein.

As shown in FIGS. 1-4, as the gapped line of products proceeds along a second portion 21B of its path of travel through the metering station 17, the products further will be engaged by a series of fingers, lugs or projections 28 that are rotated or carried into engagement with the gaps or areas of separation 27 between each of the products by a gapping or paddle wheel 29. The gapping wheel generally will be formed from a nonstick or nonskid material, mounted on a rotating drive shaft or axle 31 and being driven by a motor or similar drive system (not shown), so as to be rotated in the direction of and in timed relation with the movement of the products along section 21B (FIG. 1) of their path through the metering station. The fingers, lugs or projections 28 of the gapping wheel generally will be arranged at substantially equally spaced locations about the circumference of the gapping wheel, as indicated in FIGS. 1-4, with this spacing typically based on the size and/or configuration of the products or bricks being fed through the metering station.

Figure 5:
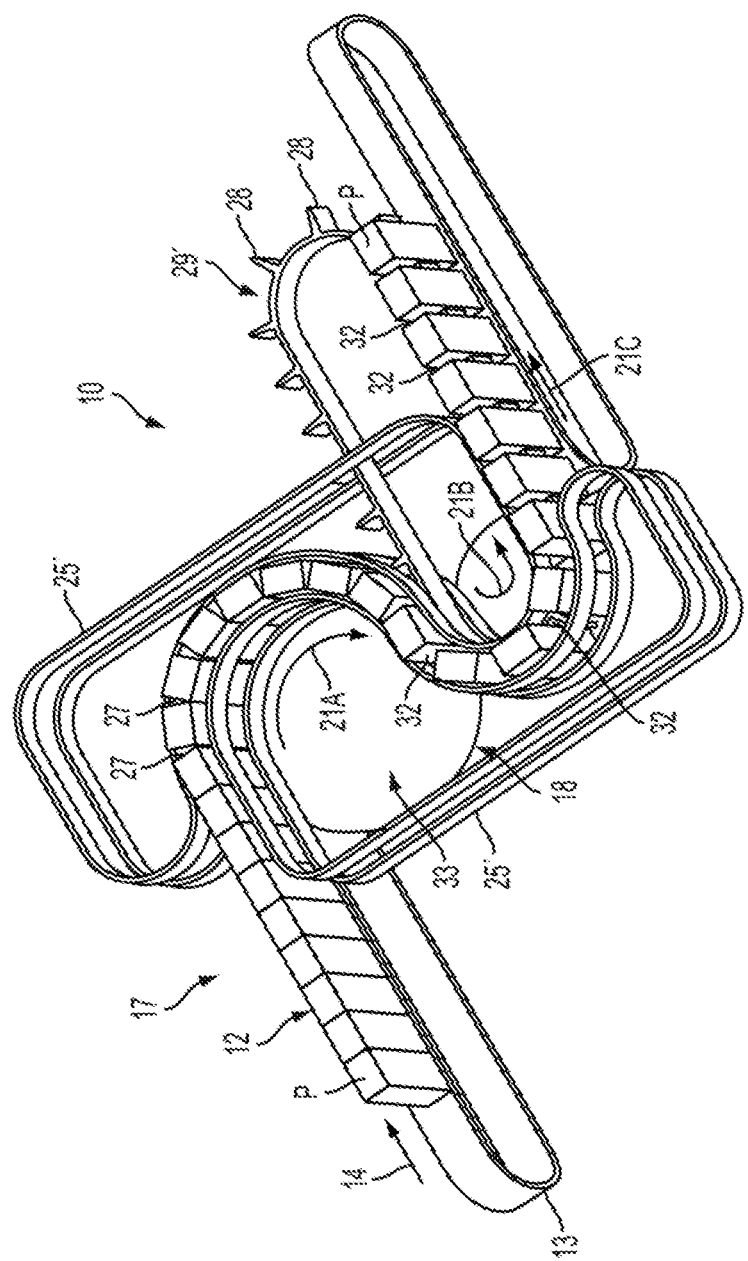
FIG. 5 is a perspective view of an alternative embodiment of the metering station.

The gapping or paddle wheel 29 also can be formed as a change part that can be removed and/or changed-out to accommodate varying size and/or configuration products to be metered, selected and grouped through the metering station and thus the product selection and grouping system 10 according to the principles of the present invention. Alternatively, the fingers or projections 28 can be formed as a series of replaceable lugs or other, similar elements that can be removed to or added from the gapping wheel at varying spacing's and/or locations as needed or desired. This also could include pivotally mounting the fingers or lugs 28 to the gapping wheel 29 in an arrangement whereby selected ones of the fingers or projections can be selectively retracted or extended as needed, without having to change-out an entire gapping wheel, and/or without having to remove the selected fingers or lugs when not required for the size and/or configuration of products being processed through the product selection and grouping system. As a further alternative, as shown in FIG. 5, the gapping or paddle wheel could be replaced by a belt or chain 29', or a movable rack mechanism, with the gapping belt 29' having a series of projections or fingers 28 mounted in spaced series therealong so as to form the spaces between the desired/selected ones of the products.

The rotation of the gapping wheel 29 (FIG. 1) in timed relation with the continued movement of the products about the second section 21B of the path of travel of the products through the metering station, causes the fingers 28 of the gapping wheel to be engaged within the initial gaps or openings 27 formed in the line of products. As a result, as indicated in FIG. 1, as the gapping wheel rotates its fingers or lugs 28 into the gaps 27 between the products P, the products will become separated, so as to introduce a series of spaces or product gaps 32 of a desired size gap or length "g" between each of the products. The engagement of the fingers in such spaces or product gaps also can help hold the line pressure of the products so as to provide a controlled, metered flow of products with spaces therebetween and enable engagement of the line 12 of products P by a downstream grouping wheel 35.

As further indicated in FIG. 4, as the products (i.e., the aseptic bricks) are moved along their path of travel 21A-21C through the metering station, the products typically can be supported on and moved along a static dead plate 33 mounted on and/or forming part of the frame 18 of the metering station. The dead plate generally will comprise a flat sheet or plate having a substantially smooth, non-stick upper surface 33A over which the bricks/products are moved by operation of the metering wheel, gapping wheel and grouping wheel. Alternatively, the dead plate 33 could be replaced by one or more driven discs or plates that generally are rotated in timed relation with the rotation of the gapping wheel 29, grouping or transfer wheel 35, and/or the metering wheel 25 (i.e., by being mounted on an axle or drive shaft thereof) to help reduce friction as the bricks/products are moved through the metering station. For example, as indicated in FIG. 5, a rotating or driven plate 33 can be provided to help control and/or provide a smooth movement of the bricks/products through the metering station, such as when a series of belts or other, similar metering, gapping and grouping/transfer mechanisms are used to form the product groups.

The grouping or transfer wheel 35 (FIGS. 1-2) typically is made or formed from a nonstick, reduced friction material, in similar fashion to the metering and gapping wheels 25 and 28, and will include a series of spaced fingers, lugs or similar projections 36. The spacing of the fingers 36 of the grouping wheel 35 generally will be provided based upon a desired number of products to be formed into each product group G, as well as taking into account size and/or configuration of the products. For example, as shown in FIGS. 1 and 4, in the present embodiment, a pair of generally equally spaced fingers 36 can be provided about the circumference of the grouping or transfer wheel 35 for separation of the products into groups G of products, each of which contains four products. It will, however, be understood that while the grouping or transfer wheel 35 is shown in the present embodiment with a pair of fingers 36, additional fingers or lugs, or even a single finger or lug also can be used for forming greater or lesser sized product groups as needed or desired.

In addition, the fingers 36 of the grouping or transfer wheel 35 can be formed as replaceable change parts, or can be pivotally mounted so as to be movable between a retracted, non-engaging position and an extended or engaging position. As a further alternative, the grouping wheel itself can be provided as a change part, to enable the change-out and/or reconfiguration of the metering station as needed to accommodate different size and/or configuration of products and/or for the formation of different size product groups; or as still a further alternative, can be replaced by a belt, chain, or movable rack having the fingers 36 mounted at spaced locations therealong. Additionally, the driving or rotation of the grouping wheel also can be controlled so as to vary the speed or rate of rotation thereof, so that the movement of the fingers of the gripping wheel into the spaces of the line of products can be timed and/or varied to transfer varying size groups or numbers of products at different desired pitches to a downstream product grouping conveyor 40.

As further shown in FIG. 1, as the products P are fed along the third or last portion 21C of their path of travel through the metering station 17, the fingers 36 of the grouping wheel 35 will be rotated into selected ones of the spaces 32 formed in the line of products, with the grouping or transfer wheel being driven at a rate so that the fingers selectively enter the line of products between a set number of products and will urge the products forwardly. For example, as illustrated in figures, the fingers of the grouping wheel can enter the spaces 32 formed between every fourth product so as to form a product groups G, each containing four products. The grouping or transfer wheel can be mounted on a drive shaft 38 of a motor (not shown) and can be driven at a rate slightly faster than the movement of the line of products through the metering station so that the products of each group G of products are gathered and urged forwardly into an edge-to-edge abutting relationship, thus forming the groups G of products. These product groups are moved along third section 21C of the path of travel of the products through the metering station to a discharge point 37 at which the groups of products are picked up by a downstream grouping conveyor 40.

As indicated in FIGS. 1, 3 and 4, the grouping conveyor 40 generally can include a belt or other, similar conveying mechanism 41, typically having a substantially smooth, solid upper surface 42 on which the groups G of products P are received. A series of guide rails or walls 43 (FIGS. 1 and 4) will be provided along the longitudinal length of the grouping conveyor 40, with the guide rails generally including varying length or size rails, so as to define a series of product lanes 44 along the product grouping conveyor 40. Each of the lanes 44 will receive a selected one of the product groups and will convey the product groups in a direction of arrow 46 towards an accumulated position 47, whereby the accumulated product groups will be formed into a product pack 48 and deposited on a transfer or dead plate 49 located at a discharge end 51 of the grouping conveyor 40.

The conveyor belt 41 of the grouping conveyor 40 typically will be driven by drive motor such as a servo-motor or other motor, which can be linked to the drive motors for the gapping and grouping wheels of the metering station so as to run in substantially timed movement therewith, or can be tied to a common drive system for driving all of the operative elements of the product selection and grouping system. The grouping conveyor further typically can be run at a faster or higher rate than the rate of movement of the products being fed into the metering station, and at a rate similar to the rate of movement of the grouping wheel of the metering station for moving the groups of products away from the metering station and toward accumulation into product packs 48 over a reduced size or distance to provide a desired space savings, without substantially limiting or delaying the substantially continuous feeding, metering, selection and grouping of the products into their packs for transfer to a downstream product packaging or packing machine (not shown).

Figure 2:
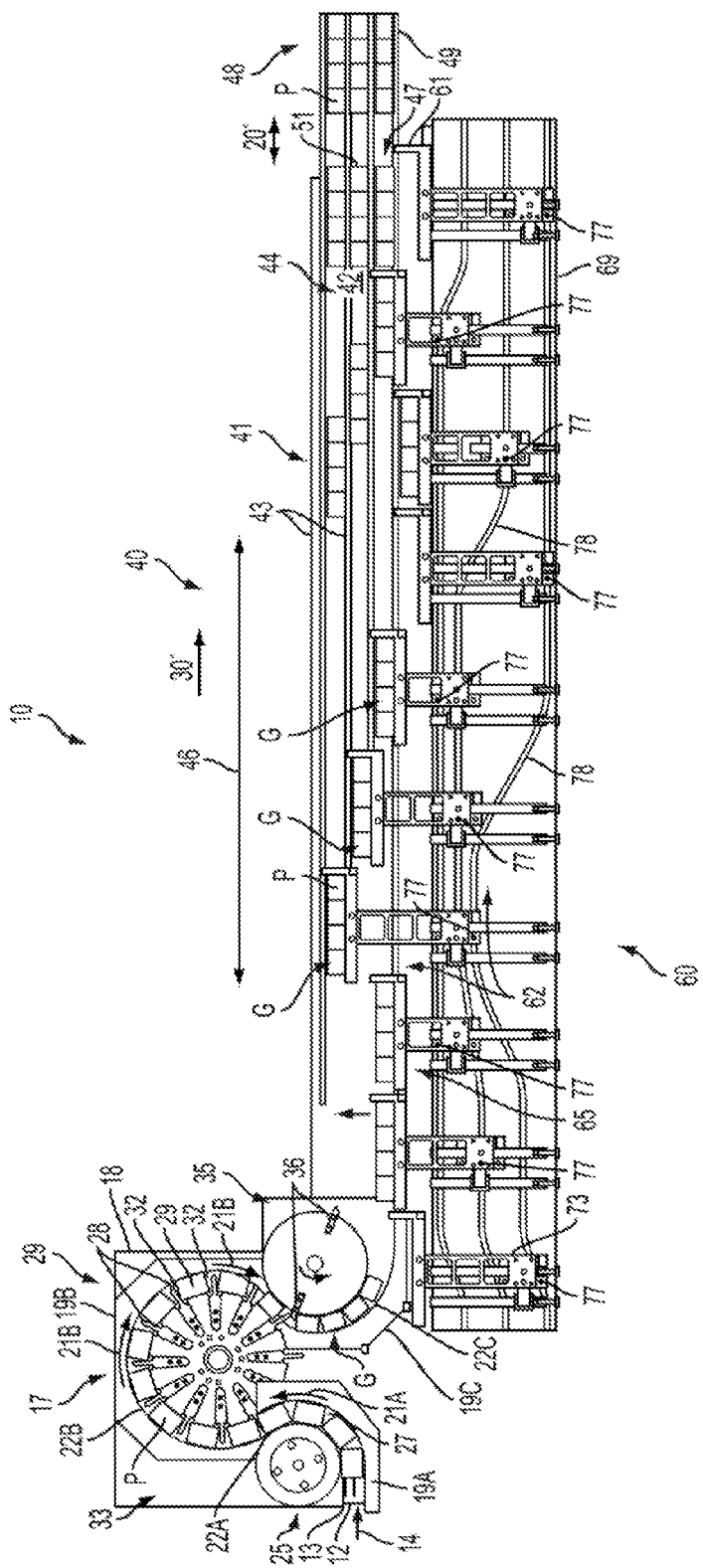
FIG. 2 is a plan view schematically illustrating the selection and grouping of the products according to the principles of the present invention.

In an alternative embodiment, as indicated in FIG. 2, the conveyor belt 41 of the grouping conveyor 40 can include a series of conveyor belts, typically one for each lane 44 formed or defined across the grouping conveyor. For example, for 3 lanes, 3 conveyor belts (shown at phantom lines 41A-41C) can be provided. Each separate conveyor belt 41A-41C can be independently operated so as to be driven at different speeds to provide for the "catch-up" of the groups of products received on each of the conveyor belts at their accumulated position 47. As a further result, the release of the groups of products by their associated laning flights 62 of the laning unit 60 may not need to be controlled to provide for different release points, as discussed below, to enable the movement of the product groups into alignment for forming a product pack 48.

In addition, as shown in FIGS. 1 and 4, a laning unit 60 generally will be located along a lateral side 61 of the grouping conveyor 40. The laning unit 60 will include a series of laning flights 62 that are movable into engagement with each of the product groups and are further movable laterally across the conveyor belt 41 of the grouping conveyor 40, in a direction transverse to the direction of the longitudinal path of travel 46 of the product groups received on the product grouping conveyor, as indicated by arrows 63 and 63' for placement of the product groups G within selected ones of the lanes 44 of the conveyor 40. The laning flights 62 generally will be arranged in sets or groups, generally according to a number of lanes into which the product groups are to be divided. For example, in the embodiment illustrated in the figures, the laning flights 62 are arranged in sets or groups of three laning flights for selectively placing the product groups into 3 lanes formed along the grouping conveyor. It will, however, be understood that the groups of laning flights can be organized or formed with greater or fewer numbers of laning flights based upon the number of product groups to be accumulated into each product pack 48 (FIG. 1). Thus, even though the product grouping conveyor can be provided with multiple lanes, not all of the product lanes need to be used; for example, the laning flights can be organized into groups or sets having a smaller number of laning flights than the product grouping conveyor has lanes, and with each group or set moving along an associated or aligned one of a series of alternative cam tracks 78.

The laning flights 62 of the laning unit 60 further can be provided as change parts that can be removed or substituted as needed. As indicated in FIGS. 1 and 4, each of the laning flights generally will include an elongated flight plate or engagement member 65 and adapted to engage selected groups of products for moving the groups of products laterally across the product grouping conveyor. Each flight plate 65 further can have a substantially L-shaped configuration, including a laterally extending forward or leading finger 66 having a rear engaging face 67 against which a foremost product P' of the selected product group will be engaged, and a second, substantially horizontally extending base portion 68 having a substantially flat face 69 along the side surfaces of each of the products contained within the selected product group. The flight plates of each laning flight will control and stabilize the products as the product groups are moved laterally/transversely across the product grouping conveyor. As indicated in FIG. 4, the flight plates 65 of each of the laning flights 62, also can have a reduced size or configuration so as to enable the flight plates to move beneath or between the innermost guide rails or walls 43 defining the product lanes 44 of the product grouping conveyor 40. Thus, as the flight plates of each of the laning flights are retracted in a direction of arrow 63', they can pass beneath these guide rails without interference while leaving the product groups to move forwardly along their selected lanes 44 of the product grouping conveyor 40 in the direction of arrow 46.

As further shown in FIGS. 1 and 4, flight plates 65 of each of the laning flights generally are mounted on a forward end of an elongated arm or bracket 71, which in turn is mounted on a carriage 72. Each of the carriages further is mounted on, supported and carried by guide rails 73, the ends of which are mounted on drive belts or chains 74 (FIG. 4) of a drive system 76 of the laning unit 60. Each of the carriages further typically includes one or more cam rollers or cam followers 77 (FIG. 2) that engage and roll along a selected or associated cam track 78 extending along the body 79 of the laning unit 60.

As also generally illustrated in FIGS. 1 and 4, the laning unit 60 will have a series of cam tracks 78, generally including at least one cam track for each of the individual laning flights of each group of laning flights, or based on the number of lanes of the product grouping conveyor (i.e., for sets of 3 laning flights, there can be 3 cam tracks). Each cam track can have a different configuration or pitch so as to control the depth or length of travel of its associated laning flights 62 transversely across the product grouping conveyor as needed to reach the selected product lane 44 in which the product groups engaged by the lane flights will be deposited. The support brackets 71 of the each of the flight plates 65 further can be of varying lengths or sizes depending upon the depth of length of travel for each laning flight across the product grouping conveyor. Thus, as illustrated in FIGS. 1 and 4, for example, the laning flights engaging the groups of products to be placed in the outer-most or furthest lanes of the product grouping conveyor generally will be moved across the greatest distance or range of movement by their cam tracks, and further typically will be released from engagement with their selected product groups before the product groups engaged by the laning flights for the closest or inner-most lanes of the product grouping conveyor. The laning flights associated with the product groups being moved along the inner-most or closest product lanes also can be maintained and engagement therewith for a longer period of time or before release to facilitate the catching up of the product groups of the outer-most lanes 44 therewith.

Alternatively, the laning unit 60 of the product grouping conveyor 40 can include a series of flight plates or shuttles linked to and driven across the conveyor belt 41 by actuators such as cylinders or motors. An example of such a drive system for the flight plates 65 of the laning flights 62 is disclosed in pending U.S. published Application No. 2014/0061000 A1, the disclosure of which is incorporated in its entirety as fully set forth herein.

The laning flights generally will be arranged along the laning unit conveyor at a pitch or spacing so as to move into engagement or with selected ones of the product groups as the product groups are discharged from the grouping wheel of the metering station. As the laning flights engage their selected product groups, the cam rollers associated with will be carriages thereof will engage and roll along the cam tracks 78, causing the laning flights to move laterally, in a direct transverse to the longitudinal path of travel/movement of the product grouping conveyor shown by arrow 46, across the product grouping conveyor. The product groups engaged thereby will thus be transferred to a required or selected lane of the product grouping conveyor. Once each group of products is transferred into its selected or required lane, its associated laning flight can cammed back so as to release the product group from engagement therewith. The laning flights also can be moved at a slightly slower rate than the operation of the product grouping conveyor so that the product groups are slowed slightly while they continue to be maintained in engagement with their associated laning flights.

As further indicated in FIGS. 1-3, product groups generally will be released at different, varying intervals. For example, the laning flights for the product groups placed in the outer-most lanes 44 of the product grouping conveyor that are furthest from the laning unit generally will release their associated product groups earlier than the product groups being placed within the inner-most lanes of the product grouping conveyor that are closer to the laning unit. By releasing the upstream product groups earlier than the product groups for the closer or downstream lanes, such released product groups are moved forwardly at a faster rate so as to accelerate and catch up to the other product groups as the product groups are fed to the discharge point or end 51 of the product grouping conveyor 40. As a result, as indicated in FIGS. 1 and 2, the product groups are assembled or accumulated into a desired product pack 48, here indicated as including 3 rows of 4 products each (i.e., a twelve pack) with each pack being accumulated on a dead plate or other transfer mechanism 49 (FIGS. 1 and 4). Thereafter, the product packs can be engaged by a transfer mechanism 85 (FIG. 3) such as a side running or overhead flighted lug system or other, similar transfer mechanism that will move the product packs toward a downstream packing or packaging machine (not shown).

FIGS. 6-9C illustrate various additional or alternative embodiments and/or configurations of systems 100 for selecting and forming the products P into product groups G, wherein the gapping wheel 29 of the metering station 17, shown in FIGS. 1-4 with a series of paddles or fingers 28, can be replaced with a lugged gapping wheel 101 having a plurality of lugs 102 mounted in spaced series thereabout as illustrated in FIGS. 6-9C. Each of the lugs 102 typically can include a body 103 having a first, rear or base portion 104 and an outwardly flaring or expanding second or forward portion 106, which define shoulders 107 extending or projecting laterally on either side of a projection or finger 108 that extends radially forwardly from the lug body.

In addition, the lugged gapping wheels 101 shown in FIGS. 6-9C, in similar fashion to the paddle wheel configuration of the gapping wheel 29 shown in FIGS. 1-4, generally will have a body 110 (FIG. 6) with a diameter "D" and/or circumference that is selected to match a size or desired range of sizes of the products P passing through the metering station for collecting into the product groups G. The gapping wheel 101 also can be formed as a change-part that can be readily removed and exchanged for other, different size or diameter gapping wheels, as needed to accommodate changes in the product sizes being selected and grouped. Upon such a change-out of the gapping wheel to accommodate different size and/or configuration products, the guides 19A-19C positioned about the path of travel 21 of the products through the metering station also can be moved toward or away from the gapping wheel such as by moving fasteners 111 along slots 112, to adjust the position or spacing of the guides 19A-19C along the path of travel 21A-21C of the products and with respect to the metering, gapping and transfer wheels as needed to receive the varying size products therebetween.

Figure 6:
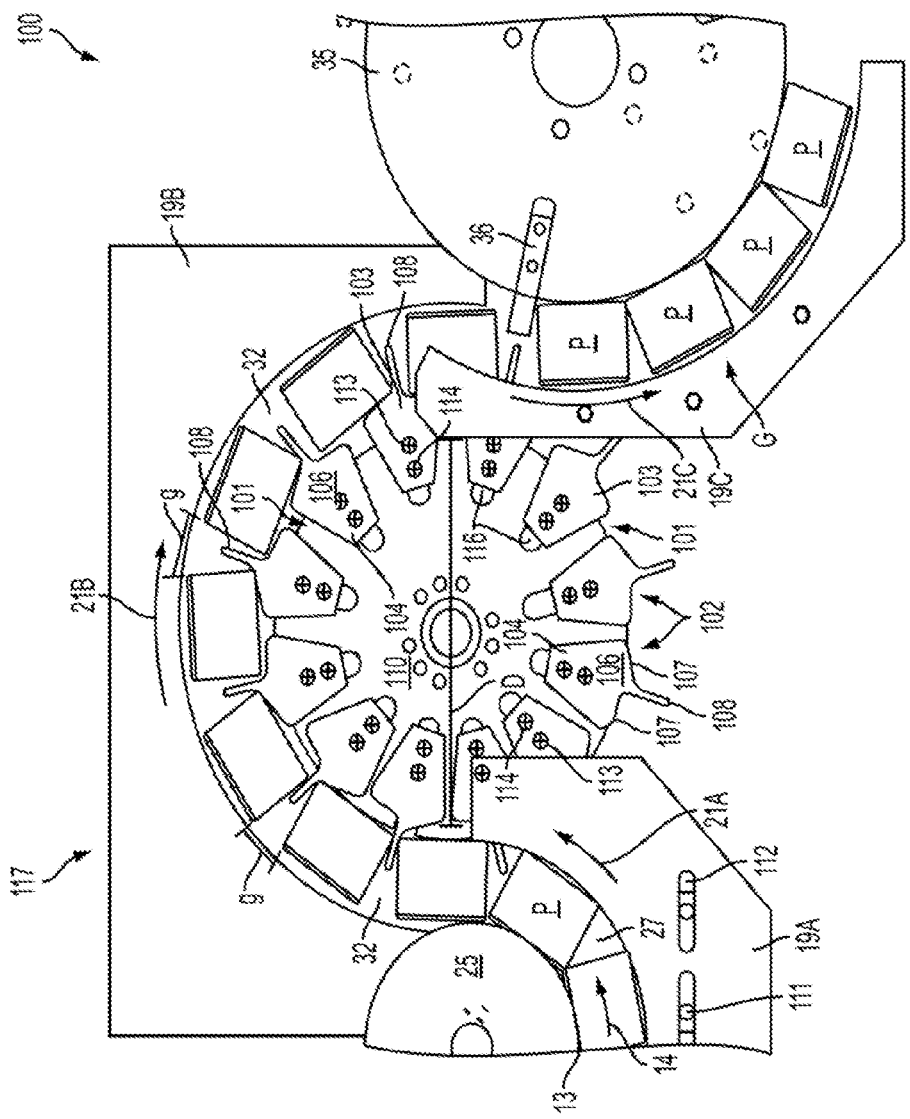
FIG. 6 is a plan view of an additional, alternative embodiment of the gapping wheel for use in the product selection and grouping system according to the principles of the present invention.

FIG. 6 illustrates one example embodiment or configuration of a metering station 117 in which the lugged gapping wheel 101 is provided with a plurality of lugs 102 that can be mounted thereto in substantially fixed positions spaced about the circumference of the gapping wheel. The lugs 102 can be selected to accommodate varying sizes and/or configurations of products, and further can be mounted in locations circumferentially spaced about the body 110 of the gapping wheel 101 to substantially ensure that the fingers or projections 108 of the lugs will engage the line of products at the initial gaps or areas of separation formed between each of the products P for forming spaces having a desired gap size "g" therebetween. Thus, the lugged gapping wheel 101 can be provided with a series of substantially fixed lugs having separations between their fingers that are selected based upon the size and/or configuration of the products being grouped.

In addition, the lugs 102 further can be adjustably mountable to the body 110 of the lugged gapping wheel 101. For example, as generally indicated in FIG. 6, the lugs 102 can be mounted to the body of the gapping wheel by one or more lug pins 113 or other releasable fasteners. The lug pins can be inserted into slots or openings 114 defined along the body 103 of each lug, and will further engage corresponding openings or slots 116 formed in the body of the gapping wheel. The lug pins 113 also can be provided with releasable locking mechanisms such as a spring detent, threaded connector, or other, similar releasable locking or connecting mechanism, for securing the pins, and thus the lugs through which they are extended, in desired positions and/or orientations on the upper surface of the gapping wheel. As a result, the lugs 102 can be quickly and easily changed-out and/or replaced without necessarily requiring a complete change-out of the lugged gapping wheel to accommodate variations in product sizes or configurations. Alternatively, existing lugs also can be repositioned radially with respect to the outer periphery or circumference of the gapping wheel without requiring replacement of the lugs in order to accommodate additional variations or changes in the sizes and/or configurations of the products being selected and grouped.

FIGS. 7-9C illustrate further alternative embodiments or configurations of the lugged gapping wheel 101 wherein the lugs 102 mounted thereon can be selectively movable radially outwardly from the circumference periphery of the gapping wheel 101. Such radially outward movement of the lugs can be controlled to selectively expand or create larger size gaps or spaces 32 between the products P for entry of the lugs 36 of the transfer or grouping wheel 35 for forming the product groups.

Figure 7:
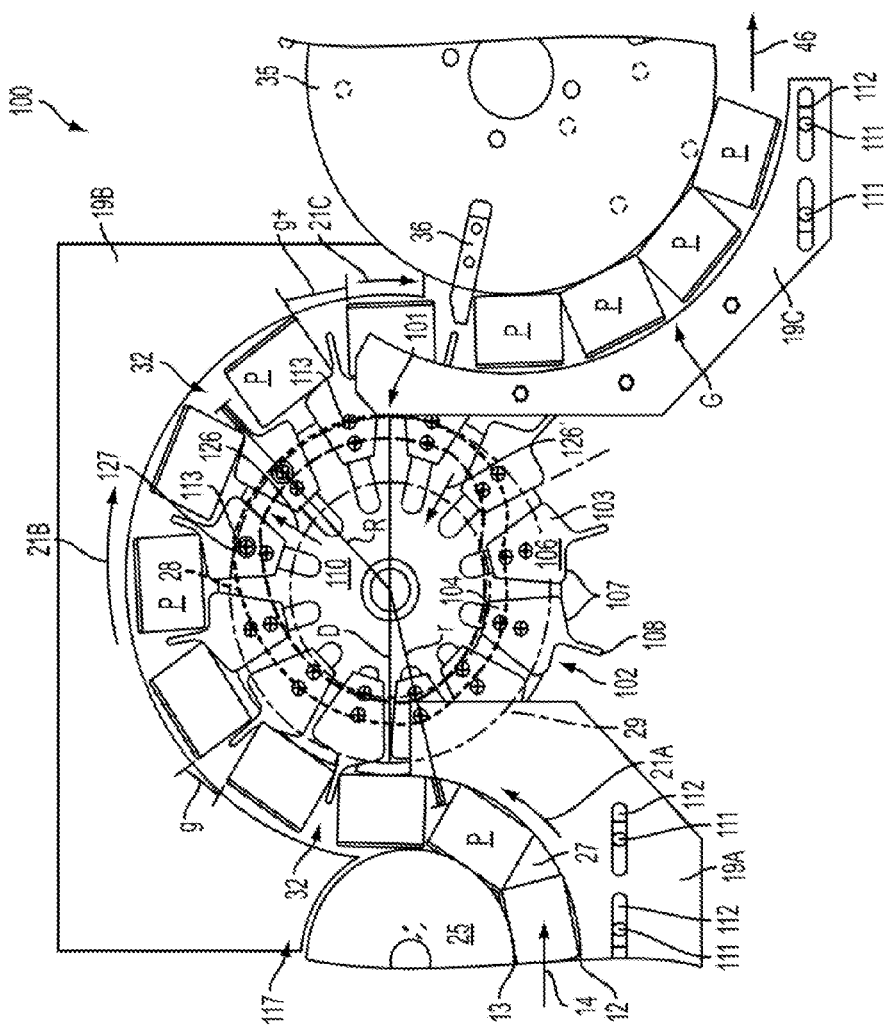
FIG. 7 is a plan view of modification or alternative configuration of the gapping wheel as illustrated in FIG. 6, wherein the gapping wheel lugs are articulable between extended and retracted positions for grouping the products.

FIG. 7 illustrates another embodiment 117 of the metering station, including a lugged gapping wheel 101 in which the lugs 102 thereof comprise articulable lugs that are generally movable radially outwardly from a first, retracted position to a second, extended position, here shown as moving between a minimum radius "r" and a maximum radius "R," so as to cause the products P to spread further apart, creating gaps or spaces 32 having an expanded or extended gap size "g+" defined therebetween. In this embodiment, each of the lugs can be mounted to the gapping wheel body along an elongated slot or groove 116 so as to enable the radial movement of the lugs between their minimum and maximum radius positions as indicated by arrows 126/126'. The lug pins 113 inserted through the body of each lug 102 to secure the lugs to the gapping wheel further can include a cam roller or follower 127 mounted along a lower or bottom portion thereof and which will engage a cam track (shown at dashed lines 128 in FIG. 7) formed in a cam plate 129 mounted beneath the gapping wheel 101.

As the cam rollers of the lug pins for each of the articulated lugs 102 move along the cam track with the rotation of the gapping wheel, indicated by arrows 131, the lugs 102 and thus their fingers 108, will be caused to move outwardly toward an extended position, such as being moved to a maximum radius R. As a result, the products are further spread apart, increasing their initial gap distance "g" to an expanded gap distance "g+", and with the products further being supported and controlled as they continue along their path of movement through the metering station by engagement of the shoulder portions 107 of adjacent lugs with inwardly facing surfaces of the products P. Thereafter, as the products are moved toward engagement with a corresponding lug 36 of the transfer grouping wheel 35, their cam rollers can be moved inwardly along the cam track so as to cause the lugs/fingers to be moved toward their retracted position, away from engagement with the products as the grouping wheel lug 36 passes into a selected one of the expanded gaps 32 formed therebetween, to thus form the desired size product group G as indicated in FIG. 7. In addition, as the gapping wheel lugs release their products, the movement of products of each product group generally can be slowed, allowing the products to be moved together or catch-up to form the product group. The enlarged or expanded gap sizes g+ can help facilitate entry of the transfer or grouping wheel lugs between the products for forming and transfer of the product groups to the grouping conveyor, and further can facilitate the exit of the gapping wheel lugs from the line of products.

Figure 8A:
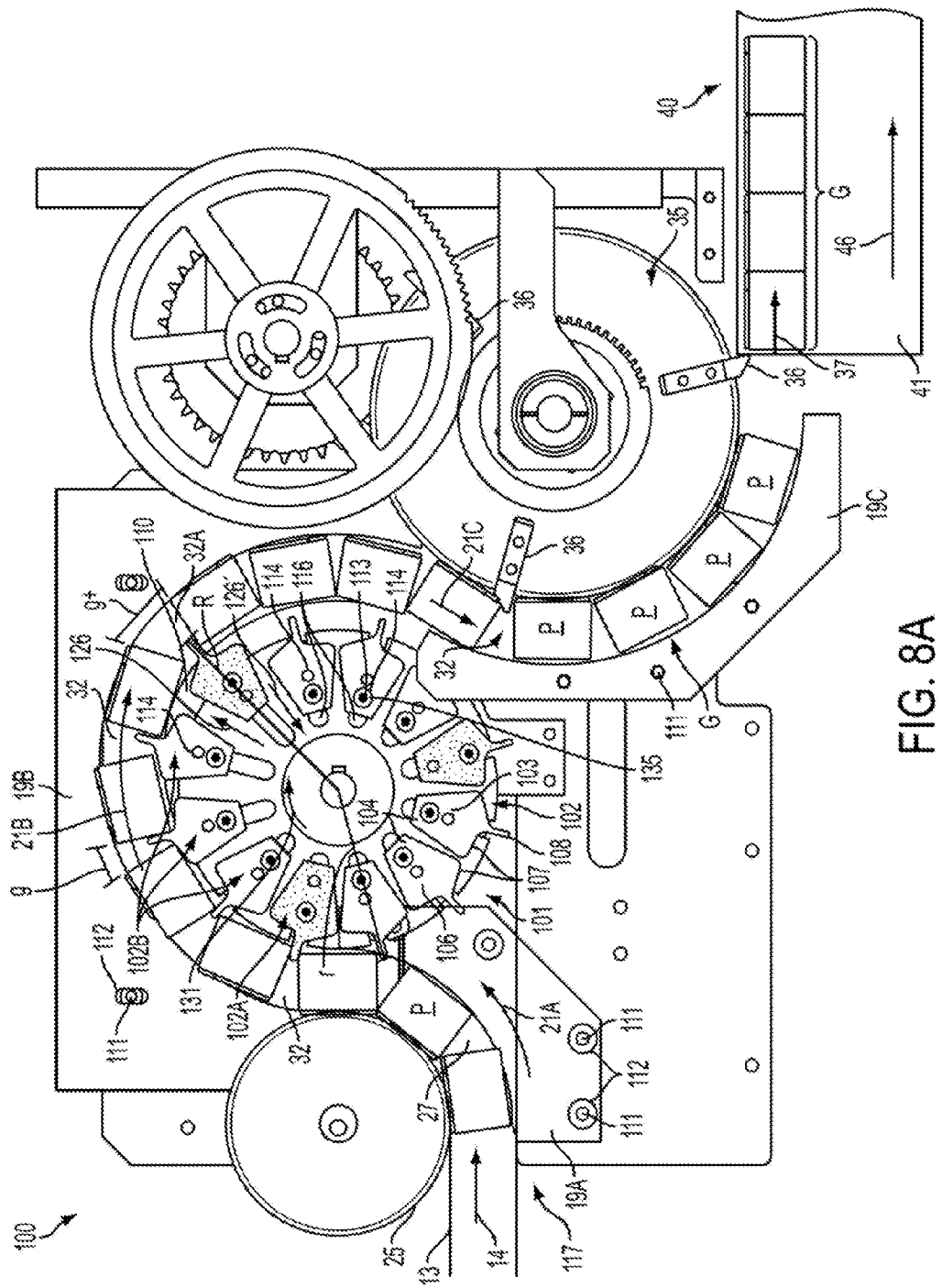
FIGS. 8A-8C illustrate still a further alternative configuration or embodiment of the gapping wheel such as illustrated in FIG. 6, wherein movement of the lugs can be selectively controlled to form spaces have a desired gap size between the products.
Figure 8B:
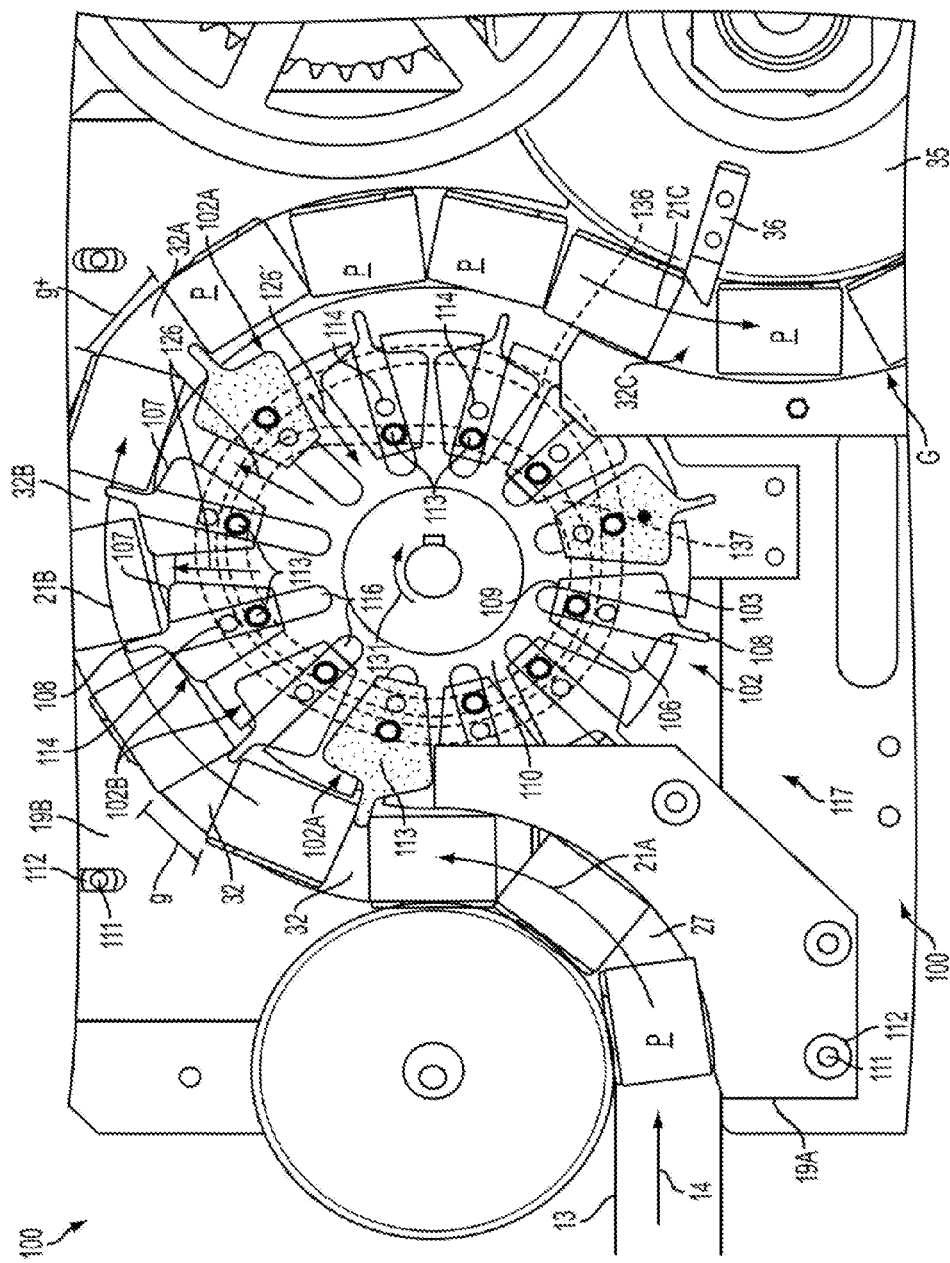
Figure 8C:
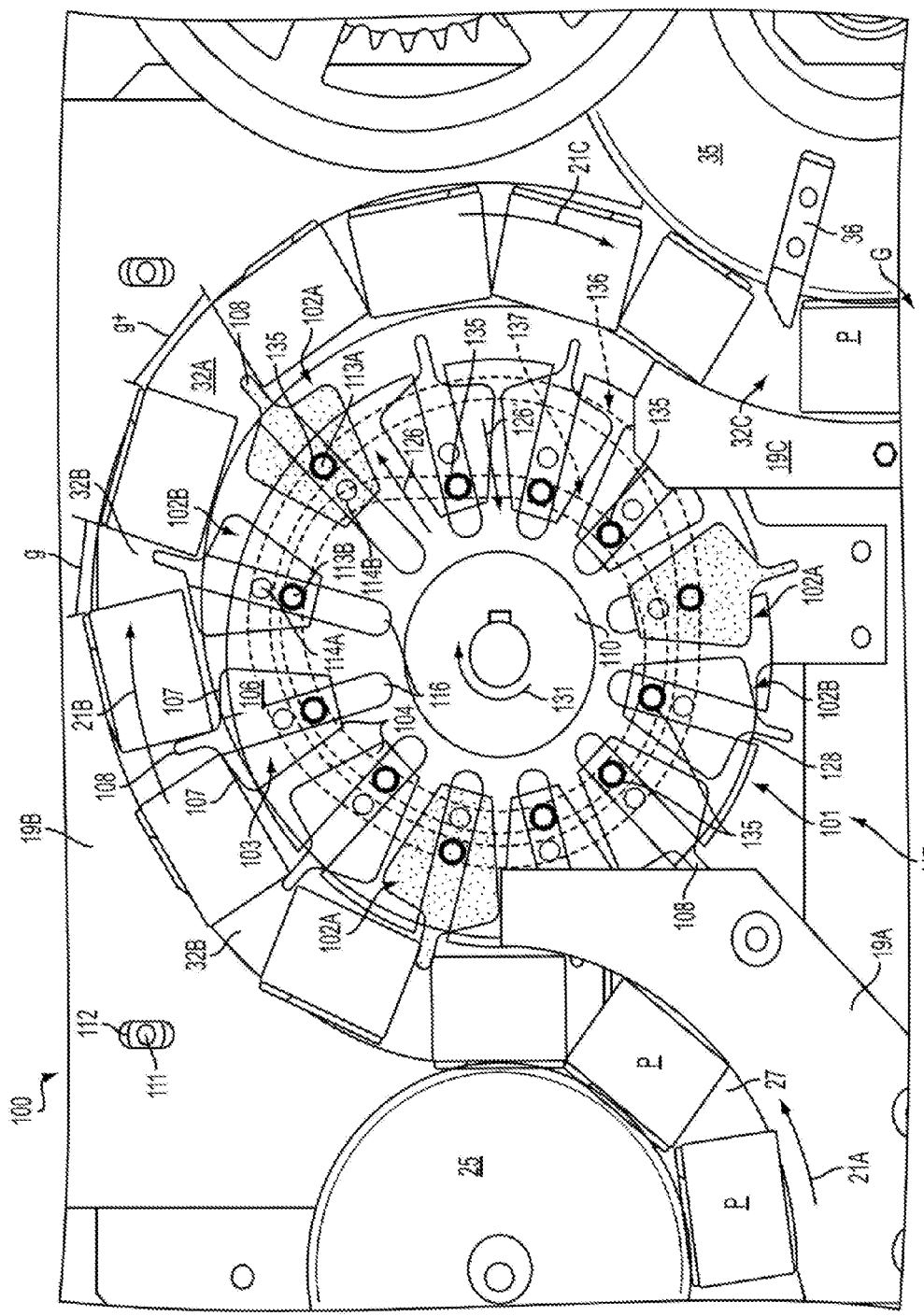
Figure 9A:
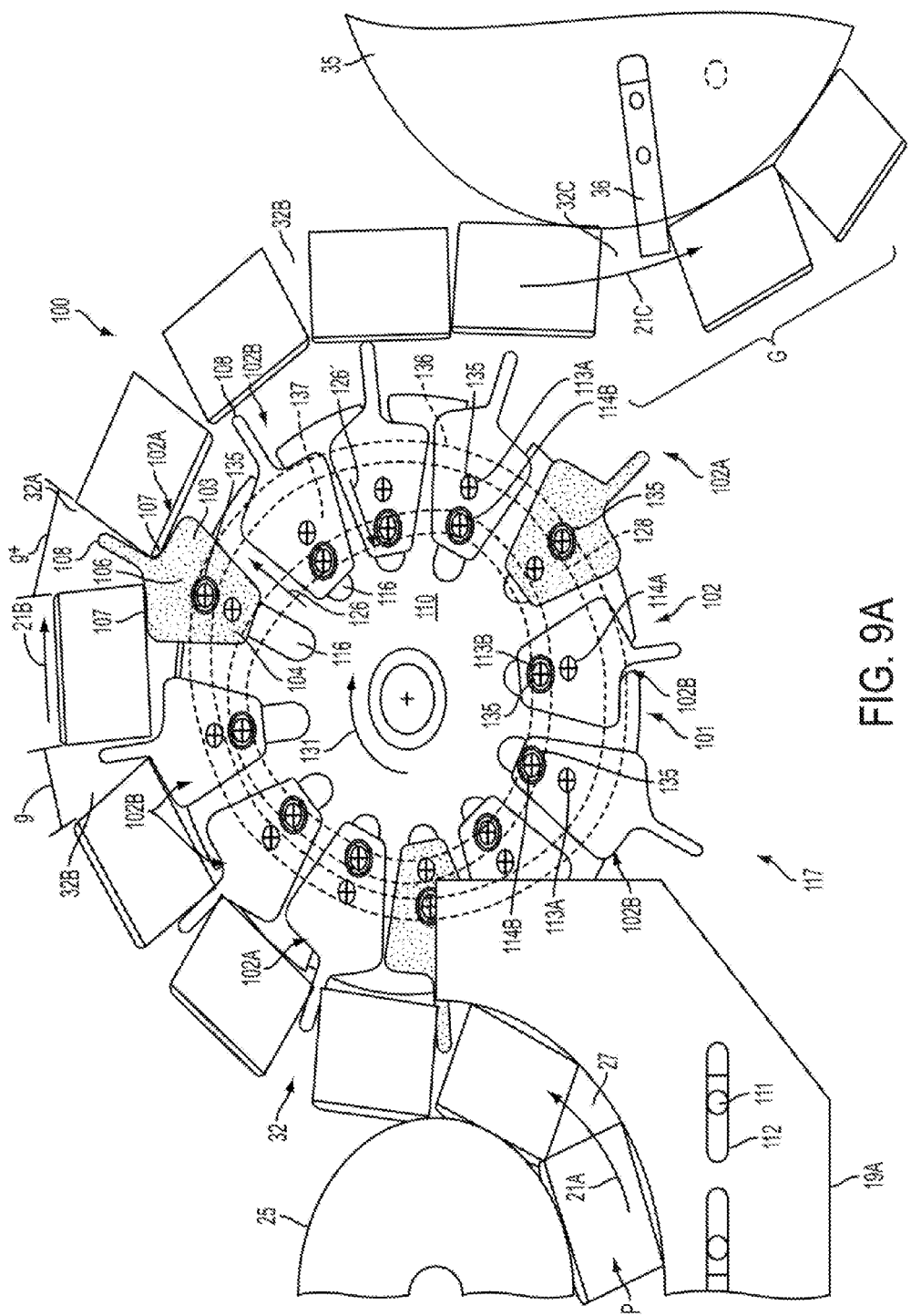
FIGS. 9A-9C illustrate various example arrangements or groupings of the lugs of the gapping wheel of FIGS. 8A-8C, to enable formation of product groups of varying sizes and/or arrangements.
Figure 9B:
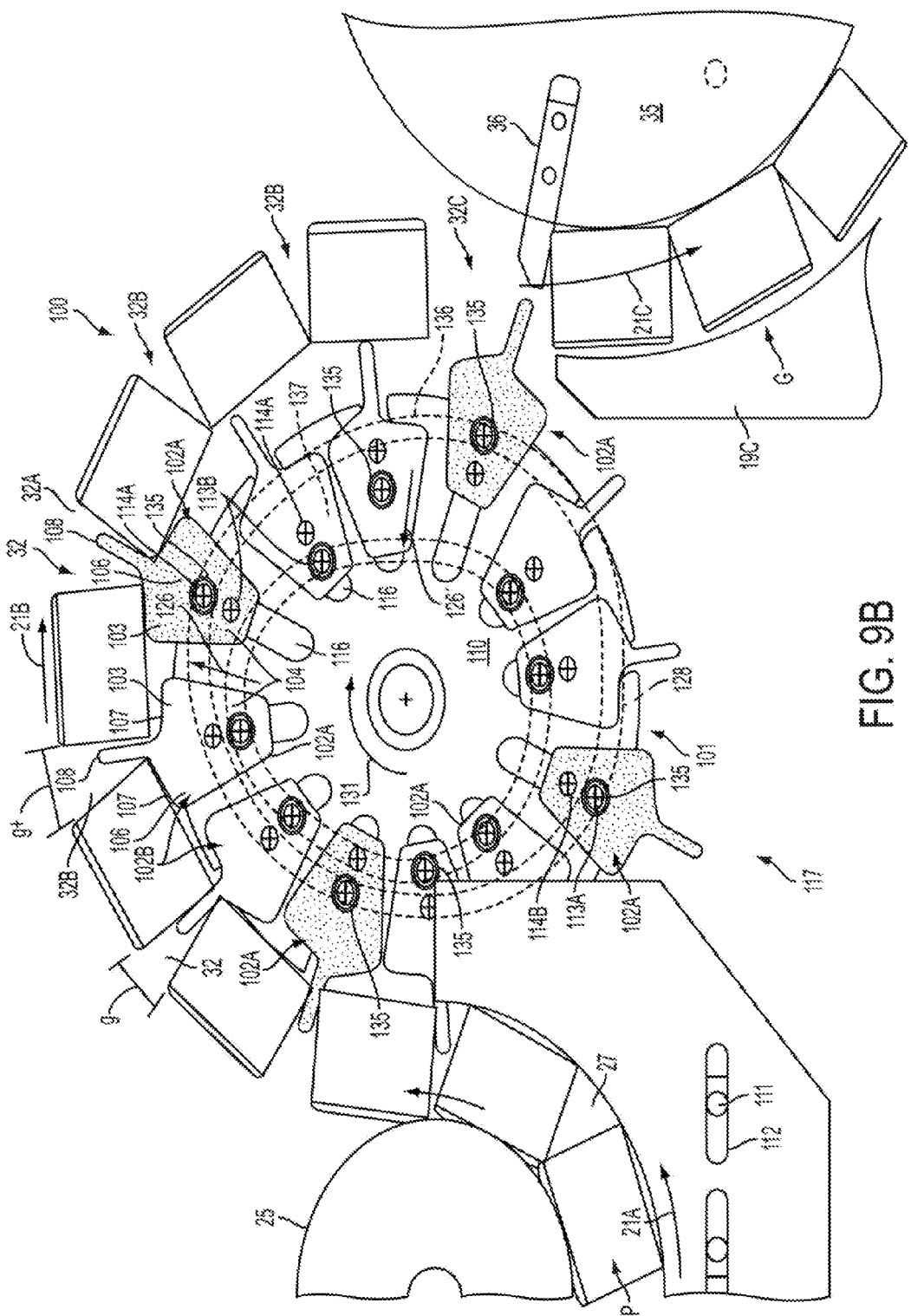
Figure 9C:
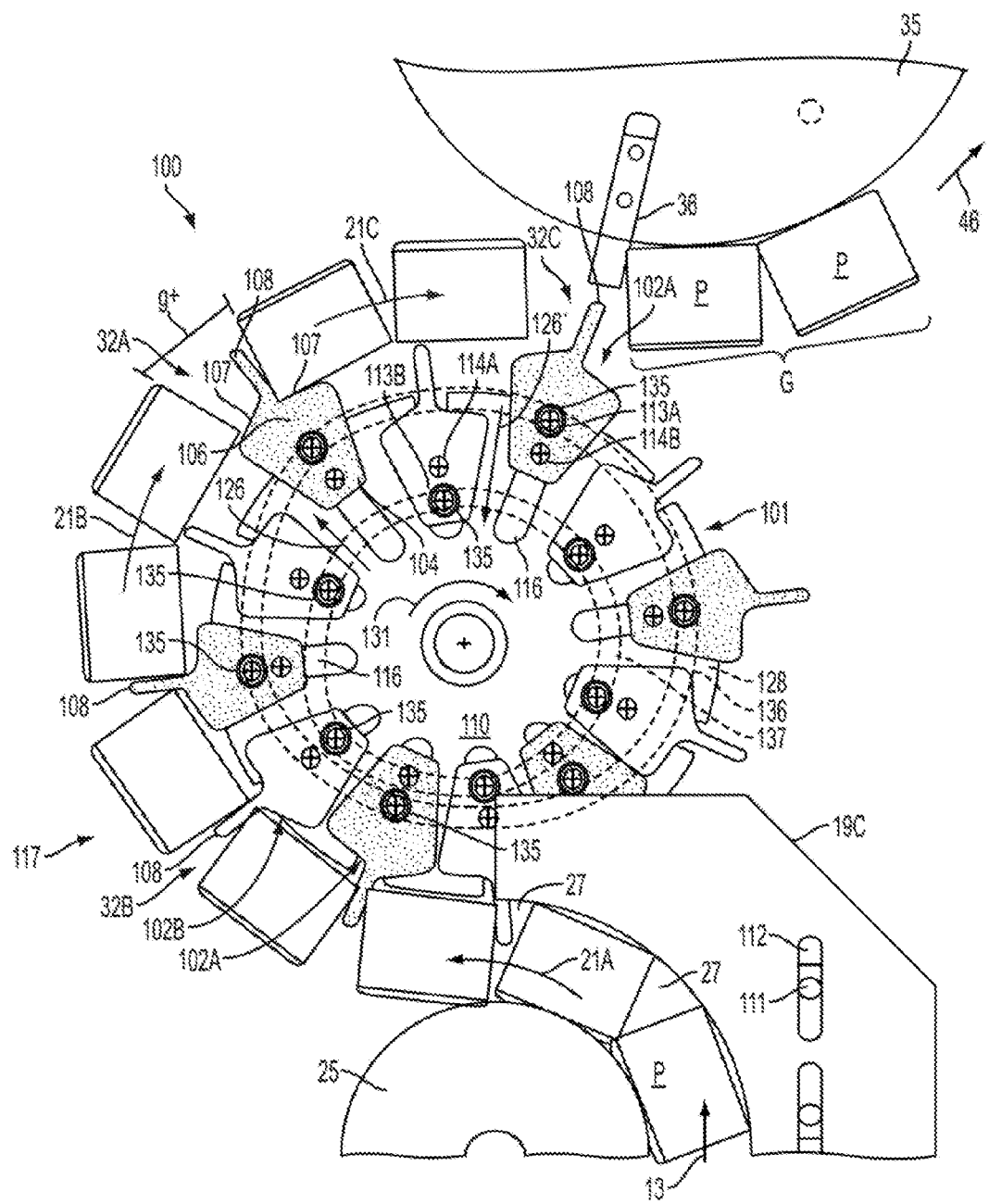

FIGS. 8A-9C illustrate still a further embodiment or configuration of the metering station 117, in which the gapping wheel 101 is provided a series of articulable lugs 102, that can be selectively movable. For example, selected ones 102A of the lugs, can be designated or selected as master lugs and can set the spacing or size for the products groups. As illustrated in FIGS. 8A-8C, one or more master lugs 102A can be provided at spaced locations about the circumference of the gapping wheel 101 with the remaining non-selected or intermediate lugs 102B mounted therebetween. However, while 3 master lugs 102A are illustrated in FIGS. 8A-8C, greater or lesser numbers of such master lugs can be used, for example, as indicated in FIGS. 9A-9C. Each lug 102A/102B can be provided with a pair of pin openings 114A/114B with the lug pin or fastener 113A/113B for each of the lugs 102A/102B being placed in a desired opening to select the number master lugs for the groups being formed and thus define the movement thereof. For example, lug pins 113A for the master lugs 102A can be placed within the first or outermost pin opening 114A, while the remaining or intermediate lugs 102B can be secured via fasteners 113B that are mounted within the second or innermost pin opening 114B.

In one embodiment as illustrated in FIG. 8C, each of the lugs can be secured to the gapping wheel with its lug pin or fastener 113A/113B having a cam follower 135 that can engage and be guided along a first or outer cam track 136, or a second or inner cam track 137 formed along a cam plate 138 mounted beneath the gapping wheel for controlling movement of the lugs 102A/102B outwardly and in a retracting motion toward and away from the products. For example, the lug pins 113A for the master lugs 102A can be placed within the first or outermost pin opening 114A so as to be aligned with and move along the first or outermost cam track 136, while the remaining or intermediate lugs 102B can be secured via lug pins 113B that are mounted within the second or innermost pin opening 114B so that their cam followers or rollers engage and move along the second or innermost cam track 136. As the gapping wheel 101 is rotated, the cam rollers or followers of the lugs 102A/102B move along their respective cam tracks to control movement of the lugs toward and/or away from the products. Additional lug pin openings, and/or cam plates having different contoured cam traces therealong can be provided, and/or the positions or locations of such lug pin openings about the gapping wheel also can be varied for further adjustment of the stroke of the lugs as needed to enable the formation of different size product groups and/or to accommodate variations in the size of the products being grouped.

As indicated in FIG. 8C, the master lugs 102A can be movable between first, retracted or minimum radius positions (r) and second, expanded maximum radius positions (R), while the remaining intermediate ones 102B of the lugs can be controlled so as to be maintained in a position, such as at the minimum or an intermediate radius location, where the lugs 102B can at least initially engage the products to form spaces 32B, but further can be moved or retracted away from the products as the lugs 102A move forwardly intro their selected or associated spaces 32A. The lugs 102A generally will be extensible or articulable between the gaps or spaces between the products by an extended distance or length as needed to create larger or expanded size g+ gaps or spaces 32A between selected products of the line of products P being fed and engaged by the fingers of the gapping wheel. In conjunction with this radially outward movement, the intermediate lugs generally can be retracted radially inwardly from their spaces 32B and away from engagement with the products. As a result, a number of products, such as for forming a selected size product group, can be collected and/or urged together, with a single enlarged gap 32C defined between each collected group of products, as indicated in FIG. 8A. In one example embodiment, this increased size space 32A can be about two or more times the size "g" of an initial space or gap between the products, and can be increased based on a number of products to be grouped (i.e., to form a 4-product group, the gap size can be 2×"g"–4×"g").

FIGS. 9A-9C illustrate various example configurations of the master and intermediate lugs mounted to the gapping wheel 101 for forming different size product groups for feeding to the grouping conveyor. For example, as illustrated in FIGS. 8A-8B and 9A, three master lugs 102A can be provided at substantially equally spaced locations about the periphery or circumference of the gapping wheel with a series of intermediate lugs 102B spaced therebetween. In the example of FIG. 9A, a series of three intermediate lugs 102B are provided so as to create a product group G including four products P. FIG. 9B illustrates an arrangement of four master lugs 102A with two intermediate lugs 102B located between each master lug for forming a product group G including three products P. In a still further example, FIG. 9C illustrates the use of six master lugs 102A, with an intermediate lug 102B spaced between each of the master lugs for forming product groups including two products. A variety of additional lug configurations each including one or more master lugs with one or more intermediate lugs arranged therebetween also can be used, as will be understood by those skilled in the art.

In operation of the lugged gapping wheel 101 of the metering station as shown in FIGS. 6-9C, the gapping wheel generally will be rotated as the line of products enter the metering station, with the fingers 108 of its lugs 102 being moved at a rate substantially matching the incoming flow of the products. As the products move about the metering wheel 25, the products are caused to separate to an extent sufficient to form an initial gap or opening 27 between adjacent side edges or surfaces thereof. As indicated in FIG. 6, in one embodiment wherein the lugs 102 are not articulated or moved across the gapping wheel 101, the fingers 108 of the lugs can be rotated into these initial gaps so as to engage and urge the products further along their path of travel through the metering station 117A. As the products are moved along the intermediate section 21B of their path of travel, the movement of the lug fingers therebetween further separates the products, forming gaps or spaces 32 having a desired gap size or spacing length g.

Alternatively, one or more of the lugs 102 can be articulated or moved further radially between a first, retracted or minimum radius position and a second, extended position (including moving to a maximum radius position) with the rotation of the gapping wheel, as illustrated in FIGS. 7-9C, to create varying size spaces or gaps, i.e., gaps having an increased gap size g+. For example, as indicated in FIG. 7, the lugs 102 can include a cam follower or roller coupled thereto and which is directed along a cam track 127 as the gapping wheel rotates. As the cam followers move along their cam track, the lugs are urged or moved radially outwardly causing their fingers 108 to move between the products as they move the products along the second or intermediate portion 21B of their path of travel through the metering station. As a result, the products generally become further separated, increasing the gap spacing g+ of the spaces 32 defined therebetween. As the products approach the transfer or grouping wheel 35, the lugs can be retracted, such as by movement of their cam followers along an inwardly directed portion of the cam track, so as to move the lugs away from engagement with the products as the products move along the third section 21C of their path of travel and are engaged by the grouping wheel lugs 36 and formed into the selected size product groups.

As further illustrated in FIGS. 8A-8C, in other embodiments, selected ones of the lugs 102A can be moved outwardly, so as to increase the gap size of the spaces 32A between selected products. In addition, the remaining non-selected or intermediate lugs 102B can be retracted from their spaces 32B. As a result, adjacent products between the lugs 102A can be collected or moved together, with a single or larger space 32C being defined between each such collection of products to facilitate grouping of the products and entry of the lugs or projections 36 of the transfer or grouping wheel 35 therein.

Thereafter, the line of products P will be engaged by the lugs or projecting fingers 36 of the transfer or grouping wheel 35. The lugs 36 of the transfer or grouping wheel 35 can be arranged at different spacings, for example, to provide a "2-up grouping" or a 3-up grouping," with 3 spaced lugs as shown in FIG. 6. Other numbers and spacings of lugs, forming greater or lesser product groupings also can be provided. The lugs or fingers 36 of the transfer or grouping wheel are received in the spaces or gaps defined between selected ones of the products (i.e., every $2^{nd}$, $3^{rd}$, $4^{th}$ product, etc. . . . ) to form the product groups. As the lugs of the gapping wheel rotate out of engagement with the products, the products of each group G will be collected and urged together and forwardly along the third section 21C of the path of travel by movement of the lugs of the grouping or transfer wheel lugs in engagement with a rearmost product of the group. The resultant product groups will then be transferred to the product grouping conveyor.

The gapping wheel with fixed or articulable lugs mounted thereto, as illustrated in FIGS. 6-9C, accordingly can provide for additional variations in the formats or size of the product groupings being formed without necessarily requiring a change out or removal of the gapping wheel to accommodate some variations in the sizes of the product groups being formed and/or variations in the configurations or sizes of the products themselves. In addition, by providing for the articulation of the lugs and thus the selective extensibility or movement of the fingers thereof between the products passing through the metering station, further variation in the gap sizes of the spaced gaps created between the products, including between endmost products of adjacent product groups, as well as variations between size of the product groups themselves can be provided. For example, all or selected ones of the lugs can be moved outwardly to a larger radius as needed to create a larger spacing or gap between the products and then retracted to avoid interference with the grouping wheel lugs. By increasing the size of the gap between the product groups, the trajectory or speed of the product groups being transferred or handed off by the transfer wheel to the grouping conveyor can be substantially matched to the speed at which the grouping conveyor is being operated, so as to facilitate a smoother, generally more consistent transition of the product groups to the grouping conveyor.

The product selection and grouping system according to the present invention can be driven via a single drive unit, with the operative stations or mechanisms being linked to, as driven in conjunction with each other via belts, chains or other, similar drive mechanisms. Thus, the system does not necessarily require specialized servo drives or control mechanisms, although multiple motors also can be used and run in cooperative engagement. The product selection grouping system further enables substantially continuous feeding of aseptic or other, similar products in aligned, abutting relationship, without requiring intermittent or start and stop motions or movements of the products, and further enables the selection and formation of such a substantially continuous line of products into product groups of selected sizes or numbers products, which thereafter can be separated into selected product lanes for compilation or accumulation into a desired size product pack within a reduced space or area.

In addition, differential speed functions of operative elements of the system can be used to enable the maintaining, gathering and collating the products into groups while thereafter enabling the separated sets of products to catch up to a previous set or group of products, as well as enabling the substantially automatic creation of a desired size or configuration product gap, and the ability to create gaps sufficient to introduce transfer lugs between successive packs for transfer to a downstream packaging machine as needed. The product selection and grouping system of the present invention thus provides a mechanism for metering, separating and discharging aseptic bricks or other, similar products and enables the discharging of such products in timed rates or feeding, in which further can be varied by the use of simplified change parts to create different numbers of products performing different product group formats of packages to the change out of wheel or lug profiles can be pitched, cam path profile and/or the camming of laning flights for movement into different numbers of lanes, as well as by simple variation of conveyor speed and length of the product selection and grouping system.

The foregoing description generally illustrates and describes various embodiments of the present invention. However, it will be understood by those skilled in the art that various changes can be made to the above-discussed construction without departing from the spirit and scope of the present invention as disclosed herein, and that it is further intended that all matter contained in the above description or shown in the accompanying drawings shall be interpreted as illustrative, and not in a limiting sense. Furthermore, the scope of the present disclosure shall be construed to cover various modifications, combinations, alterations, etc., of the above-described embodiments, which shall be considered to be within the scope of the present invention. Accordingly, various features and characteristics of the present invention as discussed herein may be selectively interchanged and applied to other illustrated and non-illustrated embodiments of the present invention.

We claim:

1. A product selection and grouping system, comprising:
   a metering station receiving and directing a flow of products along a path of travel defined therethrough, the metering station including:
   at least one metering wheel located along the path of travel of the products, the metering wheel configured to engage and create a series of initial spaces between adjacent products of the flow of products;
   a gapping wheel located downstream from the at least one metering wheel and having a series of lugs spaced thereabout, the lugs engaging at least some of the initial spaces between the products as the products move along their path of travel so as to introduce product gaps between selected ones of the products for metering the flow of products, wherein at least selected ones of the lugs of the gapping wheel are selectively articulable between a retracted position and an extended position to engage the initial space between the products and form the product gaps therebetween;
   a transfer mechanism arranged downstream from the gapping wheel and having at least one finger movable into selected ones of the product gaps to separate a series of products from the flow of products for forming product groups; and
   a conveyor adjacent the metering station located in a position to receive and direct the product groups away from the metering station.

2. The product selection and grouping system of claim 1, further comprising a dead plate extending along the path of travel, and over which the products are moved by rotation of the metering wheel.

3. The system of claim 1, wherein the metering station further comprises a series of guides defining a substantially arcuate path of travel for the flow of products moving through the metering station.

4. The system of claim 1, wherein non-selected ones of the lugs of the gapping wheel are retractable away from engagement with the flow of products as the selected ones of the lugs are in or are moving to their extended positions, to form the product gaps between the products.

5. A product selection and grouping system, comprising:
   a metering station receiving and directing a flow of products along a path of travel defined therethrough, the metering station including:
   at least one metering wheel along the path of travel of the products, the metering wheel configured to engage and create a series of initial spaces between adjacent products of the flow of products;
   a gapping wheel located downstream from the at least one metering wheel and having a series of lugs spaced thereabout, the lugs engaging at least some of the initial spaces between the products as the products move along their path of travel so as to introduce product gaps between selected ones of the products for metering the flow of products; and
   a transfer mechanism arranged downstream from the gapping wheel and comprising at least one finger movable into selected ones of the product gaps to separate a series of products from the flow of products for forming product groups;
   a conveyor adjacent the metering station at a position to receive and direct the product groups away from the metering station; and
   a laning unit adjacent the conveyor on which the product groups are received, the laning unit comprising at least one laning flight movable along the conveyor with the product groups received on the conveyor and movable across the conveyor in a direction transverse to the movement of the product groups along the conveyor to engage selected product groups.

6. The system of claim 5, wherein the conveyor comprises a series of lanes defined thereacross, and wherein the laning unit further comprises a plurality of laning flights and a series of cam tracks each engaged by an associated one of the plurality of laning flights so as to cause movement of the laning flights across the conveyor to engage and transfer the selected product groups to selected lanes of the product conveyor.

7. A product selection and grouping system, comprising:
a metering station receiving and directing a flow of products along a path of travel defined therethrough, the metering station including:
at least one metering wheel along the path of travel of the products, the metering wheel configured to engage and create a series of initial spaces between adjacent products of the flow of products;
a gapping wheel located downstream from the at least one metering wheel and having a series of lugs spaced thereabout, the lugs engaging at least some of the initial spaces between the products as the products move along their path of travel so as to introduce product gaps between selected ones of the products for metering the flow of products; and
a transfer mechanism arranged downstream from the gapping wheel and comprising at least one finger movable into selected ones of the product gaps to separate a series of products from the flow of products for forming product groups;
a conveyor adjacent the metering station at a position to receive and direct the product groups away from the metering station,
wherein each of the lugs of the gapping wheel further comprises a lug pin mounted thereto for adjustably coupling each lug along the body of the gapping wheel, and wherein the lug pins of at least selected ones of the lugs engage a cam track as the gapping wheel is rotated so as to cause the selected ones of the lugs to be moved toward and away from engagement with the flow of products to selectively form the product gaps of a desired gap size between the products.

8. A method of selecting products for grouping, comprising:
receiving a series of products generally arranged in a line at a metering station and redirecting the products along a path of travel through the metering station;
as the products are moved along the path of travel of travel through the metering station, forming a series of initial spaces between adjacent products;
moving one or more lugs of a series of lugs radially between a retracted position and an extended position, wherein the one or more lugs are each moved between selected adjacent ones of the products and are configured to separate the adjacent products sufficient to create a series of product gaps having a desired gap size therebetween so as to define product groups each having a selected number of products, wherein selected lugs of the series of lugs are moved radially outwardly into the spaces between the selected ones of the products and non-selected lugs of the series of lugs are moved radially inwardly away from the products, such that a series of products are collected together;
engaging and urging each of the product groups forwardly along the path of travel and away from a next product group; and
discharging the product groups from the metering station.

9. The method of claim 8, wherein forming the series of initial spaces comprises engaging the products with a metering wheel as the products are moved along an arcuate path of travel through the metering station to cause at least a partial separation between the products of the line of products.

10. The method of claim 8, wherein the selected ones of the lugs are each coupled to a cam follower that engages a first cam track as the gapping wheel is rotated, and are moved toward their extended position as their cam followers are moved along the first cam track, and wherein the non-selected ones of the lugs are each coupled to a cam follower engaging a second cam track as the gapping wheel is rotated, and are moved toward their retracted position as their cam followers are moved along the second cam track.

11. The method of claim 8, wherein discharging the product groups comprises releasing the product groups into selected product lanes at varying intervals, and accumulating the product groups to form a product pack.

12. The method of claim 11, wherein accumulating the product groups comprises moving selected ones of the product groups released into different lanes at different rates so as to move a series of product groups into alignment.

13. A method of selecting products for grouping, comprising:
receiving a series of products generally arranged in a line at a metering station and redirecting the products along a path of travel through the metering station;
as the products are moved along the path of travel of travel through the metering station, forming a series of initial spaces between adjacent products;
moving one or more lugs of a series of lugs radially between a retracted position and an extended position, wherein the one or more lugs are each moved between selected adjacent ones of the products and are configured to separate the adjacent products sufficient to create a series of product gaps having a desired gap size therebetween so as to define product groups each having a selected number of products;
engaging and urging each of the product groups forwardly along the path of travel and away from a next product group;
discharging the product groups from the metering station; and
receiving the product groups from the metering station on a product grouping conveyor and transferring the product groups to selected lanes defined across the product grouping conveyor.

14. The method of claim 13, wherein transferring the products to selected lanes comprises engaging each product group with an associated laning flight and moving the laning flights across the product grouping conveyor by a distance sufficient to place the product groups within their selected lanes.

15. A system for selecting and grouping products received in a substantially abutting flow of products, the system comprising:
a metering station receiving and guiding the products along a substantially arcuate path of travel, including a first path section along which areas of separation are formed between each of the substantially abutting products of the flow of products, a second path section wherein a series of lugs selectively are moved into engagement with the flow of products, the lugs configured to engage the flow of products at the areas of separation therebetween to form gaps of a desired gap size between selected ones of the products;
a grouping mechanism downstream from the projections and including at least one lug movable into selected ones of the gaps and urge a series of products forwardly to form product groups for discharge;
a product conveyor downstream from the metering station, the product conveyor receiving the product groups discharged from the metering station and moving the product groups in spaced series along a path of travel toward an accumulation point wherein the products are accumulated into product packs; and a laning unit adjacent the product conveyor, the laning unit comprising at least one laning flight movable across the product conveyor in a direction transverse to the path of travel of the products, for transferring the products to selected lanes of the product conveyor.

16. The system of claim 15, wherein the laning unit comprises a series of laning flights and a series of cam tracks engaged by associated ones of the laning flights for causing the lateral movement of the laning flights.

17. The system of claim 15, wherein the metering station further comprises a series of guides defining the substantially arcuate path of travel for the line of products moving through the metering station.

18. The system of claim 15, wherein the metering station further comprises a metering wheel located along the first path section in a position to engage and form the areas of separation between the products, and a gapping wheel downstream from the metering wheel and having a series of lugs positioned in spaced series thereabout, the lugs each including a body from which the projections extend, wherein the gapping wheel rotates the projections toward the products so as to engage at least selected ones of the areas of separation between the products to form the gaps between the products.

19. The system of claim 18, wherein at least selected ones of the lugs are articulable between a retracted position and an extended position to engage the line of products and form the spaces therebetween, and wherein non-selected ones of the lugs are retractable away from the products when the selected ones of the lugs are in or are moving to their extended positions, to enable formation of selected ones of the gaps with an increased gap size.

20. A method of grouping products moving in an edge-to-edge abutting relationship, comprising:
receiving an incoming flow of products at a metering station and directing the products along a path of travel through the metering station;
creating an initial separation between the products of the incoming flow of products;
moving a series of fingers into areas of separation between at least selected ones of the products to form spaces of an expanded gap size between selected ones of the products;
collecting a desired number of products together to form product groups;
discharging the product groups from the metering station;
receiving the product groups on a product conveyor and transferring the product groups to selected lanes defined across the product conveyor; and
accumulating the product groups to form a product pack.

21. The method of claim 20, wherein transferring the product groups comprises moving an associated laning flight into engagement with each product group and moving the laning flights across the product conveyor by a distance sufficient to place each of the product groups within their selected lanes.

22. A method of grouping products moving in an edge-to-edge abutting relationship, comprising:
receiving an incoming flow of products at a metering station and directing the products along a path of travel through the metering station;
creating an initial separation between the products of the incoming flow of products;
moving a series of fingers into areas of separation between at least selected ones of the products to form spaces of an expanded gap size between selected ones of the products;
collecting a desired number of products together to form product groups; and
discharging the product groups from the metering station, wherein discharging the product groups from the metering station comprises releasing the product groups into selected lanes of the product grouping conveyor, and moving the released product groups forwardly at a rate sufficient to move the product groups into alignment to form the product pack.

23. A method of grouping products comprising:
receiving the flow of products moving in an edge-to-edge abutting relationship at a metering station;
forming gaps between abutting products of the flow of products as the flow of products is directed along a path of travel through the metering station;
engaging the flow of products at selected gaps and expanding the selected gaps sufficient to form spaces of a desired gap size between selected ones of the products, wherein engaging the flow of products into at least selected gaps comprises articulating a series of lugs radially between a retracted position to an extended position wherein the lugs are extended into the gaps between the products, further separating the products to define the spaces therebetween;
collecting a desired number of products together to form a series of product groups;
receiving the product groups on at least one product grouping conveyor and moving the product groups transversely with respect to the at least one product grouping conveyor; and
moving the product groups with the at least one product grouping conveyor and accumulating the product groups to form a product pack.

24. The method of claim 23, wherein selected ones of the lugs are moved radially outwardly into the spaces between the selected ones of the products and non-selected ones of the lugs are moved radially inwardly away from the products, wherein a series of products are collected together with spaces having the desired gap size defined between each collected series of products.

25. The method of claim 24, wherein the selected ones of the lugs are coupled to a cam follower engaging a first cam track as the gapping wheel is rotated, and are moved toward their extended position as their cam followers are moved along the first cam track, and wherein the non-selected ones of the lugs are coupled to a cam follower engaging a second cam track as the gapping wheel is rotated, and are moved toward their retracted position as their cam followers are moved along the second cam track.

26. A method of grouping products, comprising:
receiving the flow of products moving in an edge-to-edge abutting relationship at a metering station;
forming gaps between abutting products of the flow of products as the flow of products is directed along a path of travel through the metering station;
engaging the flow of products at selected gaps and expanding the selected gaps sufficient to form spaces of a desired gap size between selected ones of the products;
collecting a desired number of products together to form a series of product groups;

receiving the product groups on at least one product grouping conveyor and moving the product groups transversely with respect to the at least one product grouping conveyor;

moving the product groups with the at least one product grouping conveyor and accumulating the product groups to form a product pack; and feeding the product groups to a series of product grouping conveyors, each defining a lane, and each moving at a different rate so as to move the product groups received thereon toward an aligned accumulated position.

\* \* \* \* \*